US008966644B2

(12) United States Patent
Hayashi et al.

(10) Patent No.: US 8,966,644 B2
(45) Date of Patent: Feb. 24, 2015

(54) INFORMATION STORING DEVICE, INFORMATION PROCESSING DEVICE, INFORMATION PROCESSING SYSTEM, INFORMATION PROCESSING METHOD, AND PROGRAM

(75) Inventors: Takamichi Hayashi, Tokyo (JP); Hiroshi Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 54 days.

(21) Appl. No.: 13/584,078

(22) Filed: Aug. 13, 2012

(65) Prior Publication Data

US 2013/0081143 A1 Mar. 28, 2013

(30) Foreign Application Priority Data

Sep. 28, 2011 (JP) .................. 2011-212267

(51) Int. Cl.
  G06F 7/04 (2006.01)
  G06F 21/10 (2013.01)
(52) U.S. Cl.
  CPC ...................................... G06F 21/10 (2013.01)
  USPC .............. 726/26; 726/27; 713/187; 380/200; 380/251; 705/18
(58) Field of Classification Search
  CPC ................................................. G11B 20/00086
  See application file for complete search history.

(56) References Cited

U.S. PATENT DOCUMENTS 7,437,771 B2 * 10/2008 Alkove et al. .................. 726/29
7,639,923 B2 * 12/2009 Ikeda et al. ................... 386/335
7,831,831 B2 * 11/2010 Ohmori et al. ................ 713/175
2002/0108036 A1 * 8/2002 Okaue ........................... 713/168
2003/0023847 A1 * 1/2003 Ishibashi et al. .............. 713/169
2003/0217265 A1 * 11/2003 Nakano et al. ................ 713/158
2003/0233559 A1 * 12/2003 Asano et al. .................. 713/189
2004/0243814 A1 * 12/2004 Nakano et al. ................ 713/189
2005/0120205 A1 * 6/2005 Umezawa et al. ............ 713/156
2006/0107047 A1 * 5/2006 Bar-El ........................... 713/168
2006/0120237 A1 * 6/2006 Asano et al. .................. 369/47.1
2006/0155855 A1 * 7/2006 Hamai .......................... 709/227
2007/0014397 A1 * 1/2007 Ukeda et al. ..................... 380/30
2009/0172825 A1 * 7/2009 Yi et al. ........................... 726/33
2010/0122079 A1 * 5/2010 Nakano et al. ................ 713/156
2010/0195982 A1 * 8/2010 Ikeda et al. ...................... 386/98
2012/0054842 A1 * 3/2012 Urios Rodriguez et al. ...... 726/6

* cited by examiner

Primary Examiner — Shewaye Gelagay
Assistant Examiner — Khoi Le
(74) Attorney, Agent, or Firm — Oblon, Spivak, McClelland, Maier & Neustadt, L.L.P.

(57) ABSTRACT

An information storing device includes a storage section configured to store revocation information that is a list of an identifier of an unauthorized device, and a data processor configured to execute determination processing of unauthorized equipment in accordance with the revocation information. The data processor extracts version information enabling identification of the issue order of the revocation information from the revocation information and transmits the extracted version information to a communication counterpart device. If the data processor receives the revocation information of a new version of the issue order held by the communication counterpart device from the communication counterpart device, the data processor executes revocation information synchronization processing of substituting the received revocation information of the new version for the revocation information of an old version stored in the storage section to store the revocation information of the new version.

17 Claims, 22 Drawing Sheets

INFORMATION STORING DEVICE, INFORMATION PROCESSING DEVICE, INFORMATION PROCESSING SYSTEM, INFORMATION PROCESSING METHOD, AND PROGRAM

BACKGROUND

The present disclosure relates to information processing devices, information processing methods, and programs. In particular, the present disclosure relates to an information processing device, an information processing method, and a program that prevent unauthorized processing such as content reproduction in an unauthorized device for example.

These days, various media such as digital versatile disc (DVD), Blu-ray Disc (registered trademark), and flash memory are utilized as information recording media. In particular, these days, use of a memory card in which a high-capacity flash memory is incorporated is popular. The user can record content of music, movie, etc. in such various information recording media and load the media in a reproducing device (player) to reproduce the content.

However, the copyrights, distribution rights, and so forth of many pieces of content such as music data and image data are owned by the creators or sellers thereof. Therefore, in the case of providing content to users, generally certain use limits are established. Specifically, only the user having the regular use right is authorized to use the content and such control is carried out that unregulated use such as unauthorized copying is prevented.

Examples of a specific configuration for use control of content include encryption processing of the content. This configuration has such setting that content provided to users is encrypted and the encryption key thereof can be acquired by only the regular user. A description about these kinds of processing is made in e.g. Japanese Patent Laid-open No. 2008-98765.

Furthermore, there is a configuration to check the validity of e.g. a reproducing device that reproduces content and a storing device that records content and prohibit content use such as content reproduction and recording if an unauthorized device is used.

Specifically, revocation information (Revocation List) in which the identifiers (device IDs) of unauthorized devices are listed is created and a device that intends to reproduce or record content causes execution of verification as to whether the ID of the reproducing device or storing device is not registered in the revocation information. Only when it is confirmed that the ID is not registered, the device permits processing of content reproduction or so forth.

When the ID is recorded in the revocation information (Revocation List), it is confirmed that this device is unauthorized and reproduction and recording of the content are prohibited.

This revocation information (Revocation List) is issued by e.g. a management server (certificate authority) that carries out content management and is sequentially updated. Furthermore, it is given an electronic signature of the certificate authority as the issuer and has such a configuration as to prevent the falsification.

The user device that performs content reproduction or so forth checks the validity of the revocation information by this signature verification of the revocation information, and thereafter checks whether or not the ID of the reproducing device or storing device that is used is registered in the revocation information. Only when it is confirmed that the ID is not registered, the processing is permitted.

If new unauthorized equipment is discovered, the management server (certificate authority) executes update processing of the revocation information to additionally register the ID of this new unauthorized equipment. That is, the revocation information having the updated version is sequentially distributed.

The updated revocation information is provided to the user device via a network. Alternatively, it is recorded in a medium such as a disc in which content is recorded and is provided to the user device.

It is preferable to use the revocation information having the newer version in the user device. However, the update timing of the revocation information in the user device is limited to e.g. the timing of data transfer with a device, server, or medium having the revocation information of the new version, such as the timing of download of new content from the server and the timing of processing of content reproduction from a content storing medium newly purchased.

At such timing, the version of the revocation information stored in a memory of the self device is compared with the version of the revocation information that can be newly acquired. If the version of the revocation information stored in the self device is older, rewrite processing is executed. Specifically, the revocation information that can be newly acquired and has the newer version is acquired to be substituted for the revocation information in the memory of the self device. This update processing of the revocation information will be referred to as synchronization processing of the revocation information.

However, there is a possibility that fraud is conducted in this synchronization processing of the revocation information and processing of continuing to use the revocation information of an old version indefinitely is executed.

If such fraud is conducted, a possibility that unauthorized use of content is conducted is generated.

This is because there is a possibility of the following. Specifically, the ID of a newly discovered unauthorized device is not registered in the revocation information of an old version, and unauthorized equipment registered as unauthorized equipment in the revocation information of the new version executes unauthorized equipment determination processing based on the revocation information of the old version to thereby conduct content use as valid equipment although it is unauthorized equipment.

SUMMARY

There is a desire to provide an information processing device, an information processing method, and a program capable of preventing unauthorized content use by use of revocation information (Revocation List) of the newer version.

According to an embodiment of the present disclosure, there is provided an information storing device including a storage section configured to store revocation information that is a list of an identifier of an unauthorized device, and a data processor configured to execute determination processing of unauthorized equipment in accordance with the revocation information. The data processor extracts version information enabling identification of the issue order of the revocation information from the revocation information and transmits the extracted version information to a communication counterpart device. If the data processor receives the revocation information of a new version of the issue order held by the communication counterpart device from the communication counterpart device, the data processor executes revocation information synchronization processing of substituting the received revocation information of the new version for the revocation information of an old version stored in the storage section to store the revocation information of the new version.

According to another embodiment of the present disclosure, there is provided an information processing device including a storage section configured to store revocation information that is a list of an identifier of an unauthorized device, and a data processor configured to execute determination processing of unauthorized equipment in accordance with the revocation information. The data processor receives version information enabling identification of the issue order of the revocation information held by a communication counterpart device from the communication counterpart device. The data processor executes version comparison processing between the received version information and version information of self-device-storing revocation information stored in the storage section of the self device. If the version of the self-device-storing revocation information is newer than the version of the received version information, the data processor transmits the self-device-storing revocation information to the communication counterpart device. If the version of the self-device-storing revocation information is older than the version of the received version information, the data processor executes revocation information synchronization processing of receiving the revocation information of the newer version from the communication counterpart device and substituting the received revocation information of the newer version for the revocation information of the old version stored in the storage section to store the revocation information of the newer version.

According to another embodiment of the present disclosure, there is provided an information processing system including an information processing device configured to execute data reproduction processing or data recording processing, and an information storing device configured to have a storage section serving as a recording region of reproduction-subject data or recording-subject data of the information processing device. Each of the information processing device and the information storing device has a storage section configured to store revocation information that is a list of an identifier of an unauthorized device, and a data processor configured to execute determination processing of unauthorized equipment in accordance with the revocation information. The information processing device receives version information enabling identification of the issue order of the revocation information held by the information storing device from the information storing device. The information processing device executes version comparison processing between the received version information and version information of self-device-storing revocation information stored in the storage section of the self device. If the version of the self-device-storing revocation information is newer than the version of the received version information, the information processing device transmits the self-device-storing revocation information to the information storing device. If the version of the self-device-storing revocation information is older than the version of the received version information, the information processing device executes revocation information synchronization processing of receiving the revocation information of the newer version from the information storing device and substituting the received revocation information of the newer version for the revocation information of the old version stored in the storage section to store the revocation information of the newer version. In response to a request by the information processing device, the information storing device extracts the version information enabling identification of the issue order of the revocation information from the revocation information stored in the storage section of the information storing device and transmits the extracted version information to the information processing device. If the information storing device receives the revocation information of a new version of the issue order held by the information processing device from the information processing device, the information storing device executes revocation information synchronization processing of substituting the received revocation information of the new version for the revocation information of an old version stored in the storage section to store the revocation information of the new version.

According to another embodiment of the present disclosure, there is provided an information processing method carried out in an information storing device. The information storing device has a storage section configured to store revocation information that is a list of an identifier of an unauthorized device and a data processor configured to execute determination processing of unauthorized equipment in accordance with the revocation information. The method includes, by the data processor, extracting version information enabling identification of the issue order of the revocation information from the revocation information and transmitting the extracted version information to a communication counterpart device, and, by the data processor, executing revocation information synchronization processing of substituting received revocation information of a new version of the issue order for the revocation information of an old version stored in the storage section to store the revocation information of the new version if the data processor receives the revocation information of the new version held by the communication counterpart device from the communication counterpart device.

According to another embodiment of the present disclosure, there is provided an information processing method carried out in an information processing device. The information processing device has a storage section configured to store revocation information that is a list of an identifier of an unauthorized device and a data processor configured to execute determination processing of unauthorized equipment in accordance with the revocation information. The method includes, by the data processor, receiving version information enabling identification of the issue order of the revocation information held by a communication counterpart device from the communication counterpart device, and, by the data processor, executing version comparison processing between the received version information and version information of self-device-storing revocation information stored in the storage section of the self device. The method further includes, by the data processor, transmitting the self-device-storing revocation information to the communication counterpart device if the version of the self-device-storing revocation information is newer than the version of the received version information, and, by the data processor, executing revocation information synchronization processing of receiving the revocation information of a newer version from the communication counterpart device and substituting the received revocation information of the newer version for the revocation information of an old version stored in the storage section to store the revocation information of the newer version if the version of the self-device-storing revocation information is older than the version of the received version information.

According to another embodiment of the present disclosure, there is provided a program for making information processing be executed in an information storing device. The information storing device has a storage section configured to store revocation information that is a list of an identifier of an unauthorized device and a data processor configured to execute determination processing of unauthorized equipment in accordance with the revocation information. The program causes the data processor to carry out a processing sequence including processing of extracting version information enabling identification of the issue order of the revocation information from the revocation information and transmitting the extracted version information to a communication counterpart device, and revocation information synchronization processing of substituting received revocation information of a new version of the issue order for the revocation information of an old version stored in the storage section to store the revocation information of the new version if the data processor receives the revocation information of the new version held by the communication counterpart device from the communication counterpart device.

According to another embodiment of the present disclosure, there is provided a program for making information processing be executed in an information processing device. The information processing device has a storage section configured to store revocation information that is a list of an identifier of an unauthorized device and a data processor that executes determination processing of unauthorized equipment in accordance with the revocation information. The program causes the data processor to carry out a processing sequence including processing of receiving version information enabling identification of the issue order of the revocation information held by a communication counterpart device from the communication counterpart device, and version comparison processing between the received version information and version information of self-device-storing revocation information stored in the storage section of the self device. The processing sequence further includes processing of transmitting the self-device-storing revocation information to the communication counterpart device if the version of the self-device-storing revocation information is newer than the version of the received version information, and revocation information synchronization processing of receiving the revocation information of a newer version from the communication counterpart device and substituting the received revocation information of the newer version for the revocation information of an old version stored in the storage section to store the revocation information of the newer version if the version of the self-device-storing revocation information is older than the version of the received version information.

The programs according to the embodiments of the present disclosure are programs that can be provided by a storage medium and a communication medium to provide a program in a computer-readable format to an information processing device and a computer system capable of carrying out various program codes for example. By providing such a program in a computer-readable format, processing in accordance with the program is realized on the information processing device and the computer system.

Further other features and advantages of the present disclosure will be apparent from more detailed explanation based on embodiment examples of the present disclosure to be described later and the accompanying drawings. The term "system" in the present specification refers to a logical aggregate configuration of plural devices and is not limited to a configuration in which devices having the respective configurations exist in the same chassis.

According to the configuration of one embodiment of the present disclosure, alleviation of the processing burden in the synchronization processing of the revocation information and safe, sure processing are realized.

Specifically, the information processing device as the host device receives the version of the revocation information from the information storing device such as a memory card and performs comparison between the received version and the version of the revocation information of the self device.

If the self-device version is newer than the received version, the information processing device transmits the revocation information of the self device to the information storing device. If the self-device version is older than the received version, the information processing device receives the revocation information from the information storing device and updates the revocation information.

As above, because a configuration in which only the version is transmitted and received for the version comparison and message authentication code (MAC) and signature are set is employed, alleviation of communication processing of the equipment and the processing burden and safe, sure version comparison are enabled.

DETAILED DESCRIPTION OF THE PREFERRED EMBODIMENT

Details of an information processing device, an information processing method, and a program according to an embodiment of the present disclosure will be described below with reference to the drawings. The description will be made along the following items.

1. Outline of Content Provision Processing and Use Processing

2. Configuration Example of Information Storing Device

3. Configuration Example of Revocation Information

4. Configuration Example of Media Public Key Certificate of Information Storing Device 5. Configuration Example of Major Part of Information Processing Device (Host Device)

6. Configuration Example of Host Public Key Certificate of Information Processing Device (Host Device)

7. Synchronization Processing of Revocation Information 7-1. (Embodiment Example 1) processing example in which a MAC value for the version (Ver) of revocation information is generated and version check by MAC verification is performed 7-2. (Embodiment Example 2) processing example in which a signature (Sign) for the version (Ver) of revocation information is generated and version check by signature verification is performed 7-3. (Embodiment Example 3) processing example in which a signature for data including the version (Ver) of revocation information is employed as a signature generated in mutual authentication and version check by verification of this signature is performed 8. Hardware Configuration Examples of Respective Devices 9. Summarization of Configuration of Present Disclosure

[1. Outline of Content Provision Processing and Use Processing]

Details of the information processing device, the information processing method, and the program according to the embodiment of the present disclosure will be described below with reference to the drawings.

First, an outline of content provision processing and use processing will be described with reference to FIG. 1 and subsequent drawings.

Figure 1:
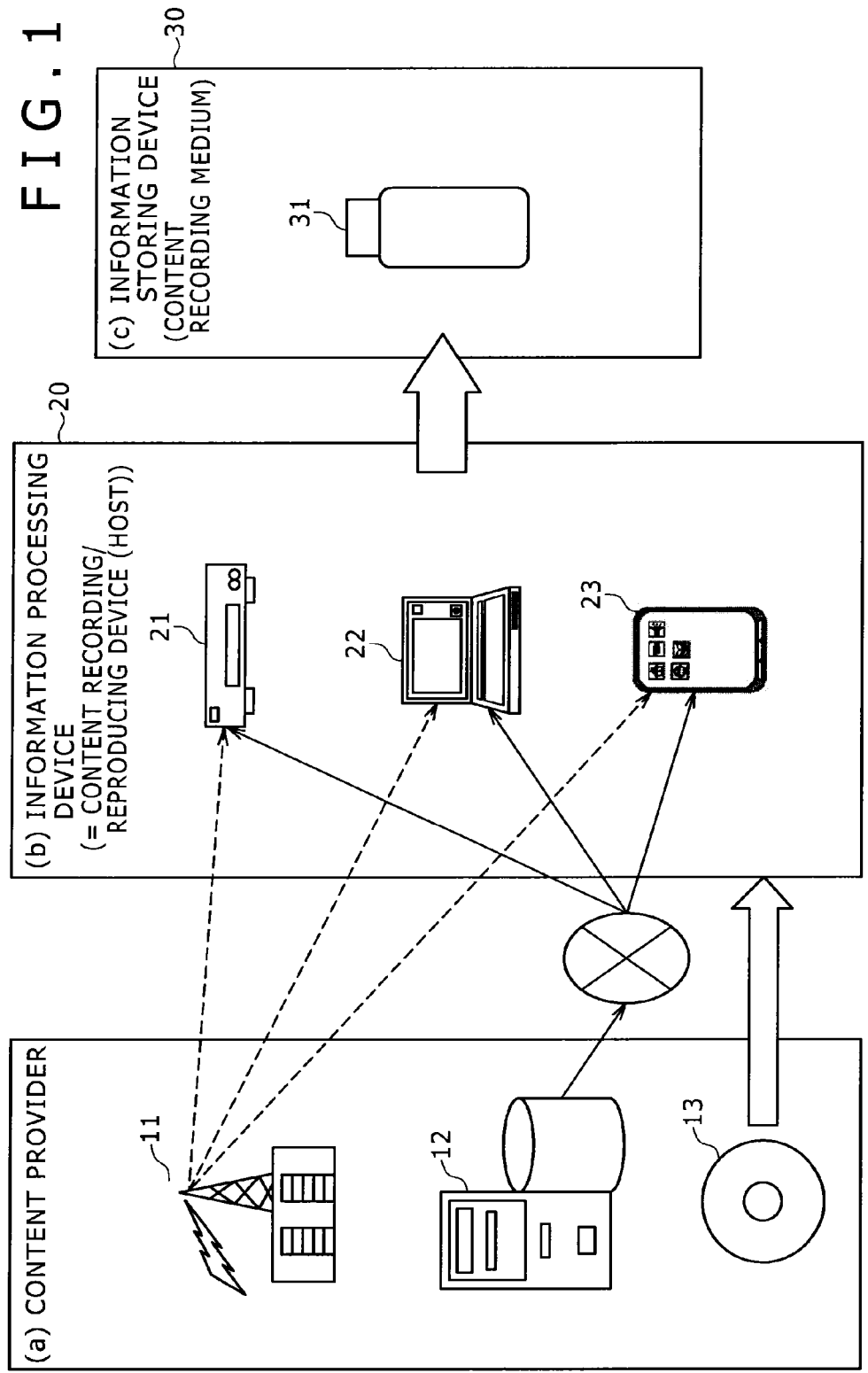
FIG. 1 is a diagram for explaining an outline of content provision processing and use processing.

In FIG. 1, examples of the following elements are shown from the left:

(a) content provider, (b) information processing device (content recording/reproducing device (host)), and (c) information storing device (content recording medium).

(c) The information storing device (content recording medium) 30 is a medium in which the user records content and that is used for reproduction processing of the content. Here, a memory card 31 that is an information storing device such as a flash memory is shown for example.

The user records various pieces of content of e.g. music, movie, etc. in the information storing device (content recording medium) 30 such as the memory card 31 and uses the content. These pieces of content include content as the use control subject, such as content as the management subject of the copyright.

Examples of the content as the use control subject include content for which unregulated copying, copy data distribution, and so forth are prohibited and content whose use period is limited. When the use-controlled content is recorded in the memory card 31, use control information (Usage Rule) corresponding to the content is also recorded.

Furthermore, provision processing and update processing are executed also about revocation information (Revocation List) that includes the identifiers (IDs) of the information processing device 20 and the information storing device 30 as unauthorized devices as registered data and is given an electronic signature by a private key of e.g. the certificate authority as the primary manager of content. This processing will be described in detail later.

(a) The content provider is a provider of content of music, movie, etc. In FIG. 1, a broadcast station 11, a content server 12, and a content recording medium 13 such as BD and DVD are shown as one example of the content provider.

The broadcast station 11 is e.g. a television station and carries various pieces of broadcast content on terrestrial waves and satellite waves via satellites to provide the content to the user device [(b) content recording/reproducing device (host)].

The content server 12 is a server that provides content of music, movie, etc. via a network such as the Internet.

The content recording medium 13 is a medium in which content of movie etc. is recorded in advance, such as BD-ROM and DVD-ROM.

The user can load e.g. the memory card 31 in the information processing device 20 and record, in the memory card 31, content received by the information processing device 20 from the external or reproduced from the content recording medium 13.

Furthermore, the information processing device 20 can read out and reproduce content recorded in the memory card 31 for example.

Examples of the information processing device 20 include recording/reproducing-dedicated equipment (consumer electronics (CE) equipment) 21 having a hard disc and a drive for DVD, BD, etc., such as a DVD player. Furthermore, the examples include a PC 22 and a portable terminal 23 such as smartphone, mobile phone, portable player, and tablet terminal. All of them are devices in which (c) the information storing device 30, e.g. the memory card 31, can be loaded.

The use form of the memory card 31 will be described with reference to FIG. 2.

The memory card 31 as one form of the information storing device 30 is a recording medium that can be attached and removed to and from content reproducing equipment such as a PC. It can be freely removed from equipment in which content recording has been performed and be loaded in another piece of user equipment.

Figure 2:
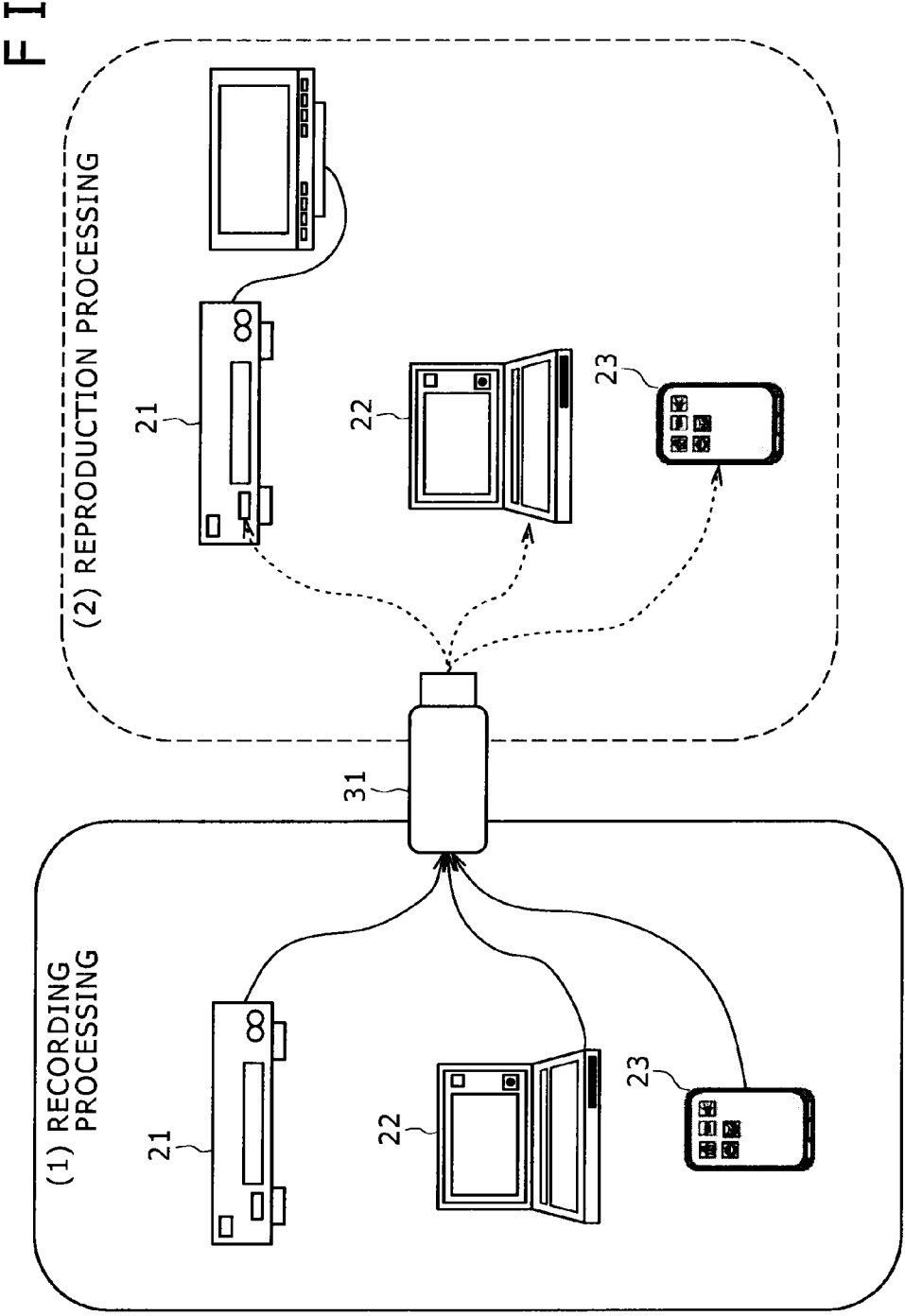
FIG. 2 is a diagram for explaining the use form of content recorded in an information storing device.

Specifically, as shown in FIG. 2, it executes the following kinds of processing:

(1) recording processing, and
(2) reproduction processing.

There is also equipment that performs only one of recording and reproduction.

Furthermore, it is not necessary that the equipment that executes the recording processing is the same as the equipment that executes the reproduction processing, and the user can freely select and use recording equipment and reproducing equipment.

In many cases, use-controlled content recorded in the memory card 31 is recorded as encrypted content and the content reproducing device such as the recording/reproducing-dedicated equipment 21, the PC 22, and the portable terminal 23 performs content reproduction after executing decryption processing in accordance with a predetermined sequence.

Furthermore, the content reproducing device executes the reproduction processing and so forth in a use permission form recorded in the use control information (Usage Rule) set corresponding to the content.

A program (host application) for carrying out content use in accordance with the use control information (Usage Rule) and decryption processing of content is stored in (b) the content recording/reproducing device (host), and the content reproduction is performed in accordance with this program (host application).

Furthermore, the following respective devices, the information processing device 20 to perform content recording/reproduction, and the information storing device 30 to store content, each store the revocation information (Revocation List), which is the list of unauthorized devices, in a storage section.

Figure 3:
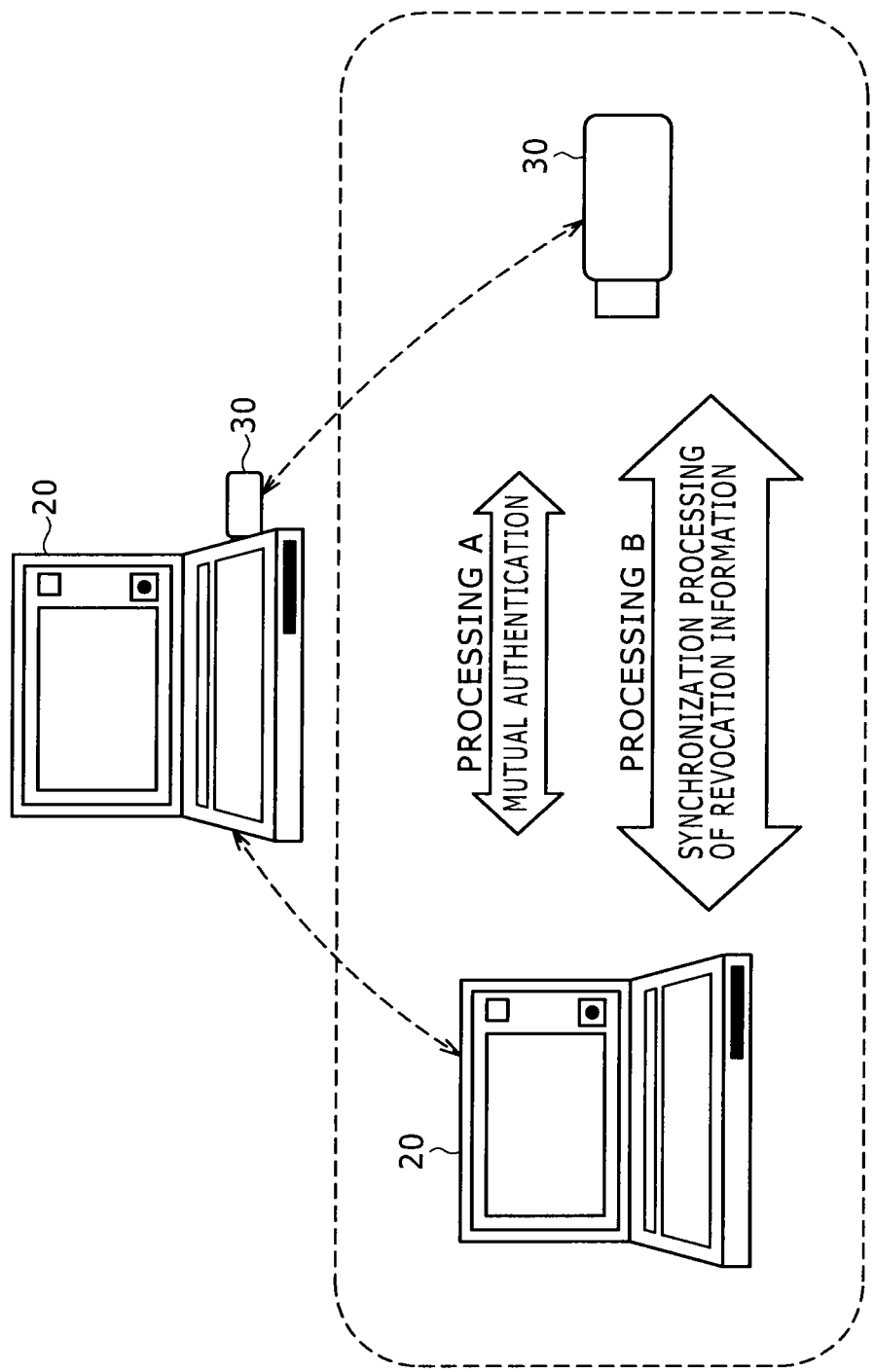
FIG. 3 is a diagram for explaining processing executed between an information processing device and the information storing device.

When the information storing device 30 such as the memory card 31 is loaded in the information processing device 20 such as the PC 22 and the information processing device 20 executes processing of recording content in the information storing device 30 or executes processing of reproducing content recorded in the information storing device 30, the following kinds of processing are executed as preprocessing thereof as shown in FIG. 3:

(processing A) mutual authentication processing between the information processing device 20 and the information storing device 30, and (processing B) revocation information synchronization processing between the information processing device 20 and the information storing device 30.

The mutual authentication processing is executed in accordance with e.g. the Elliptic Curve Diffie-Hellman (ECDH) cryptosystem, which is a public key cryptographic algorithm.

The revocation information synchronization processing is processing of carrying out version comparison between the revocation information (Revocation List) held by the information processing device 20 and the revocation information (Revocation List) held by the information storing device 30 and selecting the revocation information (Revocation List) of the newer version to replace the revocation information (Revocation List) of the device that holds the old revocation information (Revocation List) by the newer revocation information.

This update processing of the revocation information (Revocation List) will be referred to as the synchronization processing of the revocation information.

[2. Configuration Example of Information Storing Device]

A configuration example of the information storing device 30 such as the memory card 31 used as a recording medium of content will be described below.

Figure 4:
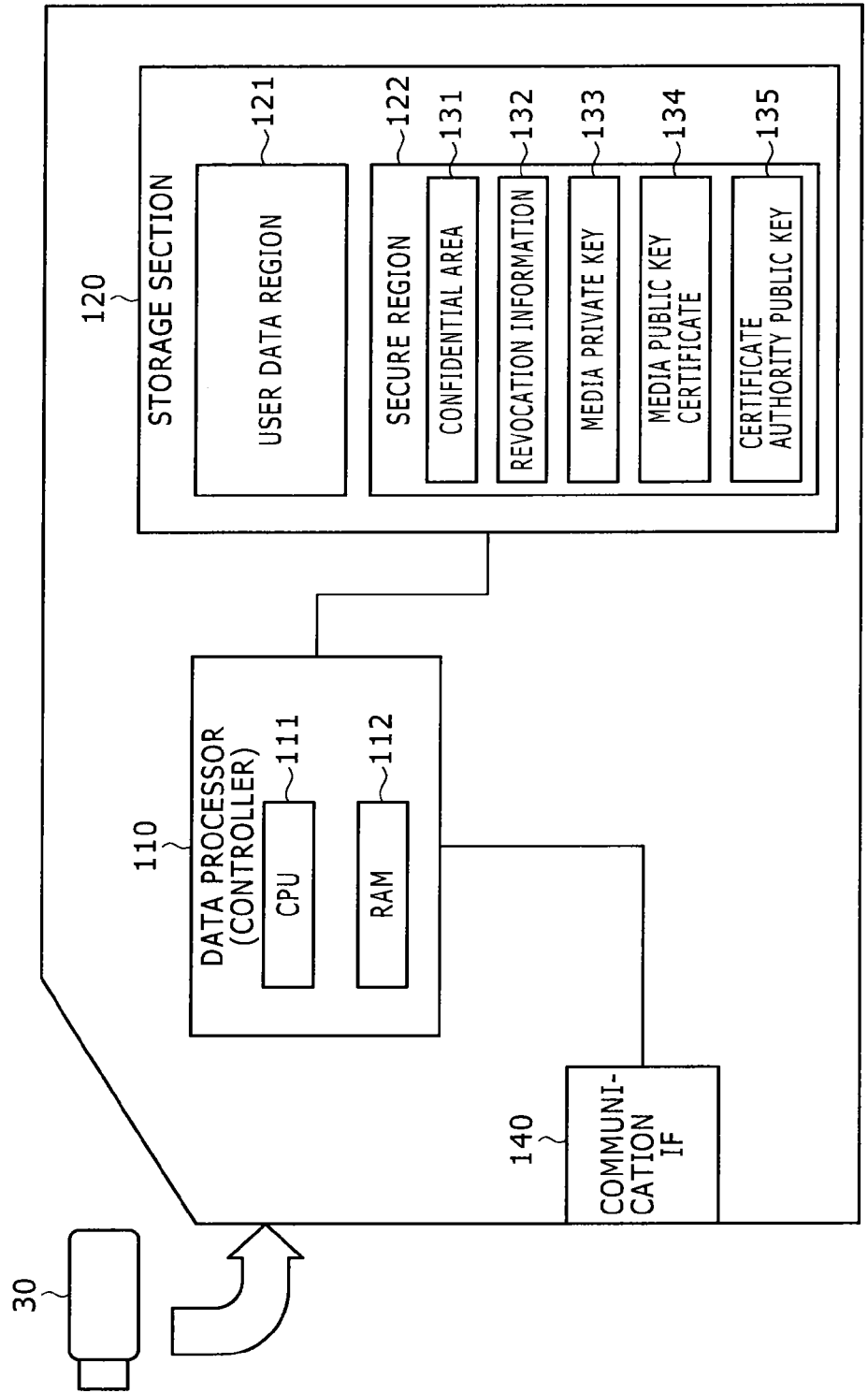
FIG. 4 is a diagram for explaining a configuration example of the information storing device.

A specific configuration example of the information storing device 30 is shown in FIG. 4.

When the information storing device 30 is loaded in e.g. the information processing device (host device) 20 to perform recording/reproduction of content, access with authentication is performed from the information processing device (host device) 20 and data reading and writing are performed.

As shown in FIG. 4, the information storing device 30 of the present embodiment has a data processor 110, a storage section 120, and a communication IF 140.

The information storing device 30 performs communication with e.g. the information processing device (host device) 20 via the communication IF 140.

The data processor 110 is configured by a CPU 111 having a program run function, a RAM 112, and so forth.

The storage section 120 is divided into a user data region 121 to which free access is permitted basically and a secure region 122 to which free access is not permitted.

A confidential area 131 is provided in the secure region 122 and various kinds of confidential information are recorded therein. Examples of the confidential information include an encryption key (title key) applied to decryption of content.

Encrypted content is recorded in the user data region 121.

In the secure region 122, the following data are further recorded:

revocation information 132,
a media private key 133,
a media public key certificate 134, and
a certificate authority public key 135.

The revocation information (Revocation List) 132 is a list in which the identifiers of pieces of unauthorized equipment, specifically pieces of unauthorized equipment such as information processing devices typified by recording/reproducing devices and information storing devices typified by memory cards, are registered. The revocation information 132 has such a configuration as to prevent the falsification by a signature of the issuer (certificate authority).

The data processor 110 of the information storing device carries out signature verification by applying the certificate authority public key 135 and checks the validity of the revocation information 132 by fulfillment of the signature verification to make discrimination as to the unauthorized device by applying the revocation information 132.

The media private key 133 and the media public key certificate 134 are a private key compatible with the information storing device 30 compliant with the public key cryptosystem and a certificate (Certificate) storing a public key. The "media" means the information storing device.

As described above with reference to FIG. 3, in the revocation information synchronization processing between the information processing device 20 and the information storing device 30, version comparison with the revocation information held by the information processing device 20 is performed.

If the revocation information held by the information processing device (host) 20 is newer, update processing of acquiring the revocation information held by the information processing device (host) 20 and replacing the revocation information 132 of the information storing device 30 by the new data is executed.

If the revocation information 132 of the information storing device 30 is newer than the revocation information held by the information processing device (host) 20, update processing of outputting the revocation information 132 of the information storing device 30 to the information processing device (host) 20 and replacing the revocation information of the information processing device (host) 20 by the new data is executed.

These kinds of processing are referred to as the synchronization processing of the revocation information.

The information storing device 30 carries out authentication and sharing of a session key (=bus key (BK)) with the information processing device (host) 20 before the synchronization of the revocation information.

On condition of establishment of mutual authentication, thereafter communication of confidential information between the information processing device (host) 20 and the information storing device 30 is performed with encryption by the session key (=bus key (BK)) or setting of signature data according to need.

Various kinds of confidential information are recorded in the confidential area 131 as described above. Examples of the confidential information include data such as an encryption key (title key) applied to decryption of content.

The confidential area 131 is divided in units of a predetermined block and access is permitted for a specific device such as a specific host on each block basis.

In the authentication processing between the information storing device 30 and the information processing device (host) 20, the information storing device 30 discriminates the access-permitted block of the confidential area 131 based on a host certificate (public key certificate) presented from the information processing device (host) 20.

The block identifier of the block to which access is permitted is registered in the host certificate (public key certificate) and the information storing device 30 discriminates the block to which access is permitted for the host based on this access permission information.

Figure 5:
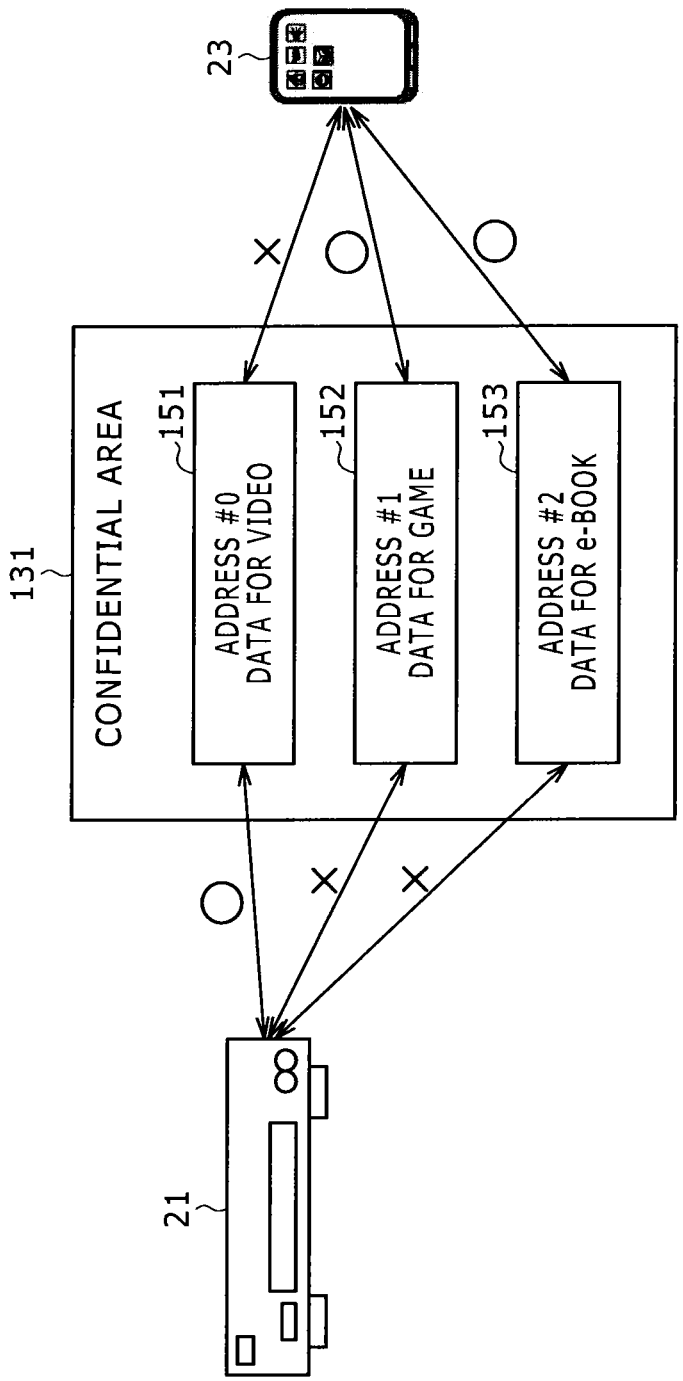
FIG. 5 is a diagram for explaining a use processing example of a confidential area of the information storing device.

As shown in FIG. 5, in the confidential area 131, the access-permitted block is separated for each of host applications carried out by the information processing device.

In the example shown in FIG. 5, a block 151 to which an address #0 is allocated is set as a block used exclusively for a video recording/reproducing application carried out by the recording/reproducing-dedicated equipment 21 and is used as the recording region of video data to be recorded or reproduced.

A block 152 to which an address #1 is allocated is a block used exclusively for a game application carried out by the portable terminal 23 and a data for the game is written thereto.

A block 153 to which an address #2 is allocated is a block used exclusively for an electronic book browsing application carried out by the portable terminal 23 and data for the electronic book (eBOOK) is written thereto.

As above, as the data written to the confidential area 131, e.g. data that is not desired to be falsified and data that is not desired to be seen are stored.

Examples of the data that is not desired to be falsified include a title key as the above-described encryption key of content, information on the rights of content (view time limit, the number of times of reproduction), and the user ID of a distribution service.

Examples of the data that is not desired to be seen include a key for decrypting encrypted content, the password of a distribution service, and a credit card number.

The CPU 111 in the data processor 110 of the information storing device 30 executes processing in accordance with a program recorded in the RAM 112 or so forth in advance.

Specifically, for example the CPU 111 executes the synchronization processing of the revocation information and so forth with the information processing device (host device) 20.

The CPU 111 carries out authentication and key sharing processing with the information processing device (host device) 20 before the synchronization of the revocation information. In the synchronization of the revocation information, encryption by the shared key or signature setting is carried out according to need for data exchanged between the information processing device (host device) 20 and the information storing device 30. This can prevent data replacement by a third person.

[3. Configuration Example of Revocation Information]

Figure 6:
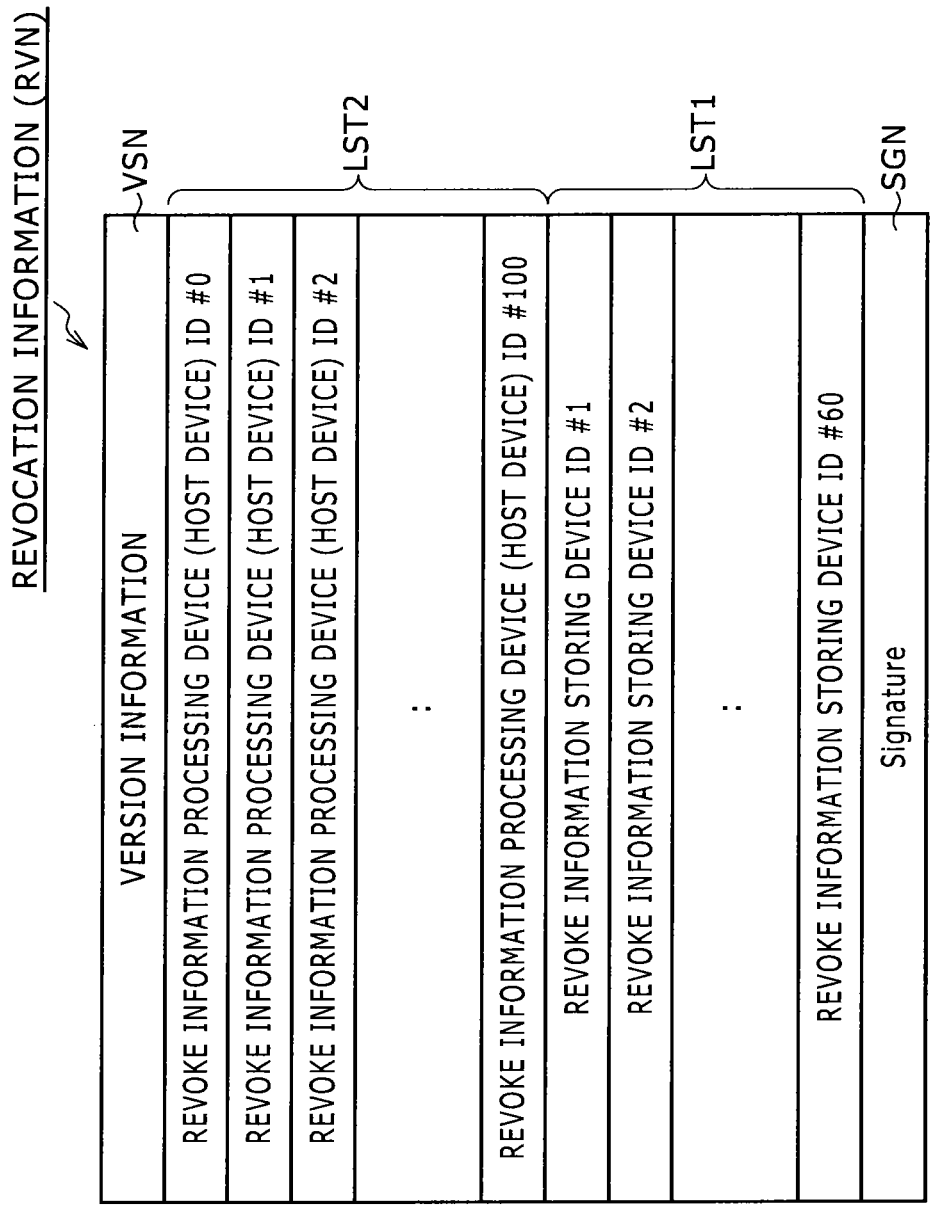
FIG. 6 is a diagram for explaining a configuration example of revocation information.

FIG. 6 is a diagram showing the revocation information (=revocation list) according to the present embodiment.

The revocation information (RVN) includes lists LST1 and LST2 in which the IDs of the revoke-subject devices discriminated as unauthorized equipment, specifically e.g. the memory card IDs (#0 to #60) of memory cards as the information storing devices and the information processing device IDs (#0 to #100) of the information processing devices (host devices), are registered.

For example, the memory card ID (#0 to #60) is 12-byte information for identifying the memory card. The information processing device (host device) ID (#0 to #100) is 6-byte information for identifying the information processing device (host device).

A version number (VSN) is further added to the revocation information.

The version number having a larger number indicates that the revocation information is newer.

Version information is information that enables identification of the issue order of the revocation information.

In the above-described synchronization processing of the revocation information, comparison processing of this version number (VSN) is executed.

The revocation information is issued by the certificate authority. A signature (SGN) is added to the revocation information by an RSA private key of the certificate authority.

When the information storing device 30 and the information processing device (host device) 20 use the revocation information, they verify the signature by the RSA public key of the certificate authority, and use the revocation information after the verification is fulfilled and it is confirmed that the revocation information is valid information free from the falsification.

[4. Configuration Example of Media Public Key Certificate of Information Storing Device]

Figure 7:
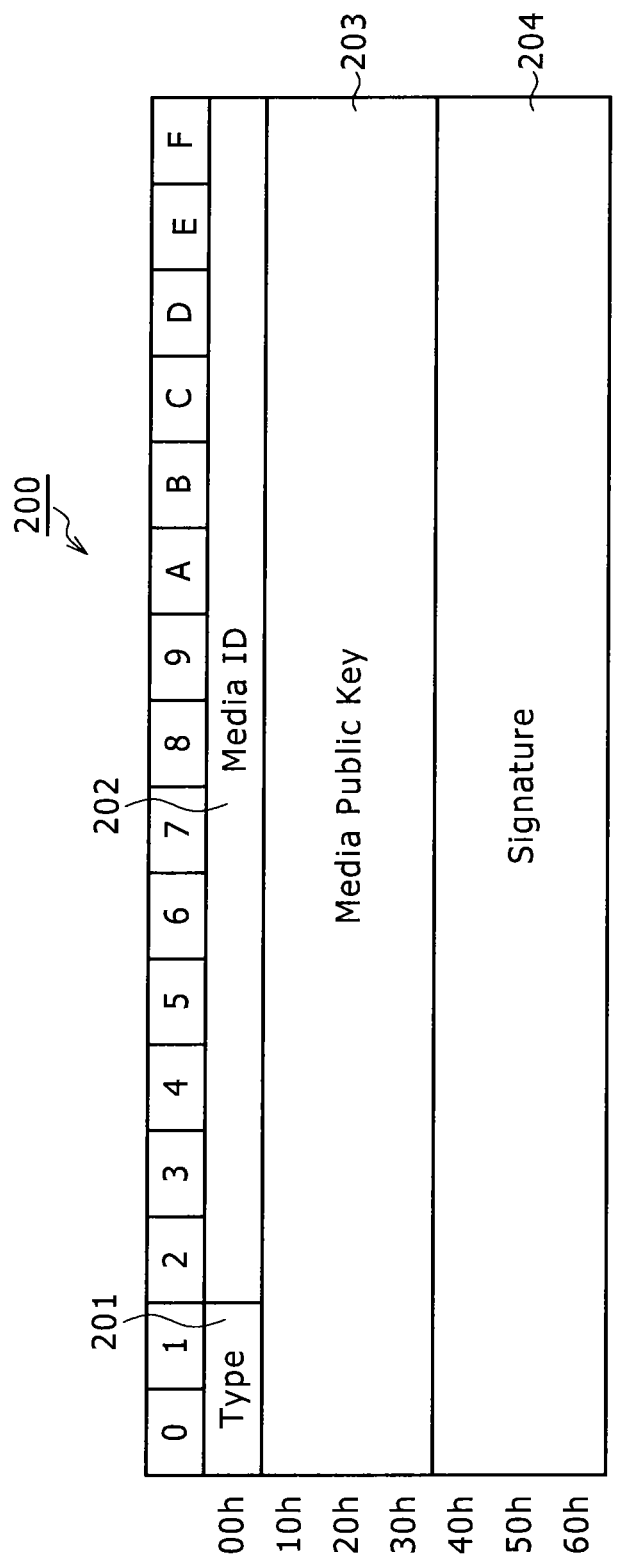
FIG. 7 is a diagram for explaining a configuration example of a public key certificate of the information storing device.

FIG. 7 is a diagram showing one example of the public key certificate of the information storing device, held by the information storing device 30 according to the present embodiment, i.e. the media public key certificate.

A certificate (Certificate) 200 shown in FIG. 7 has a type (Type) area 201, a media (Media) ID area 202, a media public key (Media Public Key) area 203, and a signature (Signature) area 204.

The type (Type) area 201 is formed of 2 bytes and a value representing the kind of certificate is stored therein. Specifically, 0002h (=Media) is stored.

The media (Media) ID area 202 is formed of 16 bytes and the media ID of the information storing device 30 is stored therein.

The media public key (Media Public Key) area 203 is formed of 56 bytes and the public key of the information storing device 30 is stored therein.

The signature (Signature) area 204 is formed of 56 bytes and a signature by a certificate authority private key (LApriv) is stored therein.

For example, Signature is obtained by the following calculation expression in signature generation.

The data of [00h-57h] of the certificate 200 of the information storing device 30 is defined as D.

ECDSA_Sign (LApriv, D)

In signature verification, Signature is verified by the following calculation expression.

ECDSA_Verify (LApub, Signature, D)

In accordance with the above expression, the signature verification is carried out by applying a certificate authority public key (LApub).

[5. Configuration Example of Major Part of Information Processing Device (Host Device)]

Figure 8:
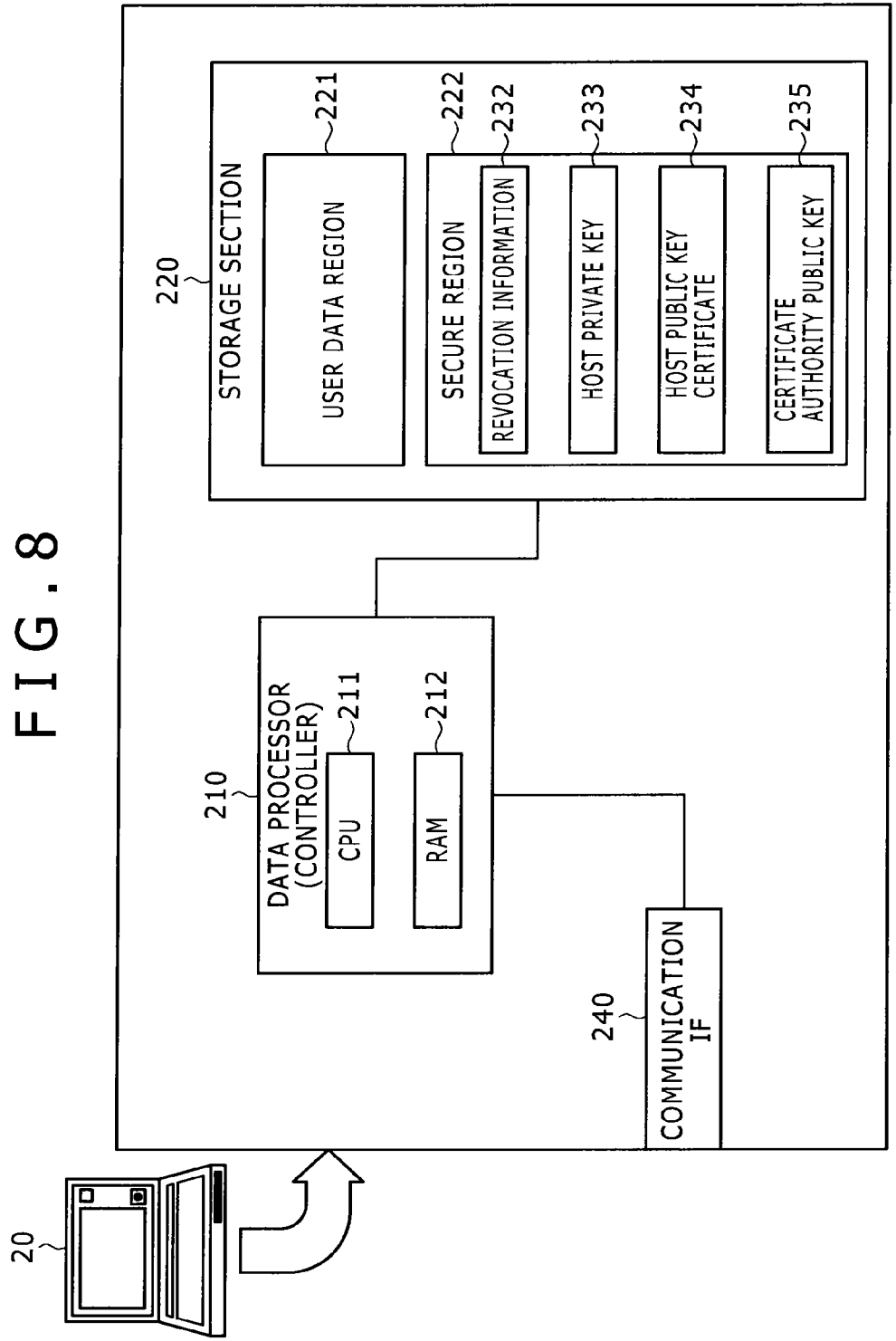
FIG. 8 is a diagram for explaining a configuration example of the information processing device.

A more specific configuration of the information processing device (host device) 20 will be described below. FIG. 8 is a block diagram showing a configuration example of the major part of the information processing device 20 shown in FIG. 1.

As shown in FIG. 8, the information processing device (host device) 20 has
a data processor 210,
a storage section 220, and
a communication IF 240.

Communication with the information storing device 30 such as a memory card is performed via the communication IF 240.

The data processor 210 is configured by a CPU 211 having a program run function, a RAM 212, and so forth.

The storage section 220 is divided into a user data region 221 to which free access is permitted basically and a secure region 222 to which free access is not permitted.

In the secure region 222, the following data are recorded:
revocation information 232,
a host private key 233,
a host public key certificate 234, and
a certificate authority public key 235.

The revocation information 232 is a list in which the identifiers of pieces of unauthorized equipment, specifically information processing devices such as recording/reproducing devices and information storing devices such as memory cards, are registered. The revocation information 232 has such a configuration as to prevent the falsification by a signature of the issuer (certificate authority).

The data processor 210 of the information processing device carries out signature verification by applying the certificate authority public key 235 and checks the validity of the revocation information 232 by fulfillment of the signature verification to make discrimination as to the unauthorized device by applying the revocation information 232.

The host private key 233 and the host public key certificate 234 are a private key compatible with the information processing device 20 compliant with the public key cryptosystem and a certificate (Certificate) storing a public key.

As described above with reference to FIG. 3, in the revocation information synchronization processing between the information processing device 20 and the information storing device 30, version comparison with the revocation information held by the information storing device 30 is performed.

If the revocation information held by the information storing device 30 is newer, update processing of acquiring the revocation information held by the information storing device 30 and replacing the revocation information 232 of the information processing device (host) 20 by the new data is executed.

If the revocation information 232 of the information processing device (host) 20 is newer than the revocation information held by the information storing device 30, update processing of outputting the revocation information 232 of the information processing device (host) 20 to the information storing device 30 and replacing the revocation information of the information storing device 30 by the new data is executed.

These kinds of processing are referred to as the synchronization processing of the revocation information.

The information processing device 20 carries out authentication and sharing of a session key (=bus key (BK)) with the information storing device 30 before the synchronization of the revocation information.

On condition of establishment of mutual authentication, thereafter communication of confidential information between the information processing device (host) 20 and the information storing device 30 is performed with encryption by the session key (=bus key (BK)) or setting of signature data according to need.

The CPU 211 in the data processor 210 of the information processing device 20 executes processing in accordance with a program recorded in the RAM 212 or so forth in advance.

Specifically, for example the CPU 211 executes the synchronization processing of the revocation information and so forth with the information storing device 30.

In the synchronization of the revocation information, encryption by the session key or signature addition is carried out according to need for data exchanged between the information processing device (host device) 20 and the information storing device 30. This can prevent data replacement by a third person.

[6. Configuration Example of Host Public Key Certificate of Information Processing Device (Host Device)]

Figure 9:
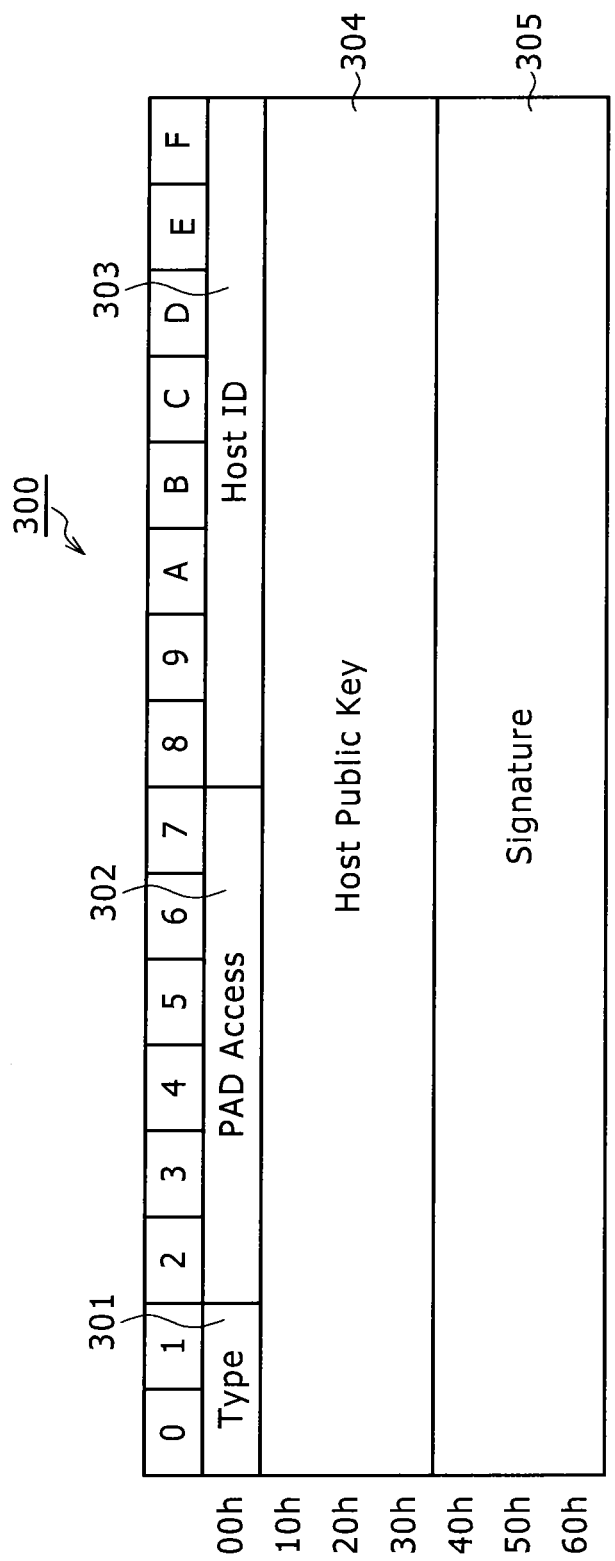
FIG. 9 is a diagram for explaining a configuration example of a public key certificate of the information processing device.

FIG. 9 is a diagram showing one example of the host public key certificate (=host certificate) stored in the information processing device (host device) 20 according to the present embodiment.

A host certificate (Host Certificate) 300 shown in FIG. 9 has a type (Type) area 301, a PAD Access (Protected Area Data Access) area 302 including attribute information, a host (Host) ID area 303, a host public key (Host Public Key) area 304, and a signature (Signature) area 305.

The type (Type) area 301 is formed of 2 bytes and a value representing the kind of certificate is stored therein. Specifically, 0001h (=Host) is stored.

In the PAD access (Protected Area Data Access) area 302, access permission information about the confidential area of the information storing device is recorded. For example, permission information relating to writing and reading in units of a block is recorded.

The host (Host) ID area 303 is formed of 6 bytes and the host ID of the information processing device (host device) 20 is stored therein.

The host public key (Host Public Key) area 304 is formed of 56 bytes and the public key of the information processing device (host device) 20 is stored therein.

The signature (Signature) area 305 is formed of 56 bytes and a signature by the private key (LApriv) the certificate authority is stored therein. For example, Signature is obtained by the following calculation expression in signature generation. The data of [00h-57h] of the certificate 300 of the information processing device (host device) 20 is defined as D.

ECDSA_Sign (LApriv, D)

In signature verification, Signature is verified by the following calculation expression by applying the public key (LApub) of the certificate authority.

ECDSA_Verify (LApub, Signature, D)

[7. Synchronization Processing of Revocation Information]

The synchronization processing of the revocation information, executed between the information processing device (host device) and the information storing device, will be described below.

As described above with reference to FIG. 3, when the information processing device 20 executes processing of recording content in the information storing device 30 or processing of content reproduction from the information storing device 30, the following kinds of processing are executed between the information processing device 20 and the information storing device 30:

mutual authentication processing, and
revocation information synchronization processing.

For the start of the processing of recording content in the information storing device 30 or the processing of content reproduction from the information storing device 30 by the information processing device 20, establishment of the mutual authentication is necessary. However, as for the revocation information synchronization processing, the completion of this synchronization processing does not necessarily need to be the condition of the start of content recording or reproduction.

In the revocation information synchronization processing, version comparison with the revocation information held by the information processing device 20 is carried out.

If it is determined that the revocation information held by the information processing device (host) 20 is newer as the result of this comparison processing, update processing of providing the revocation information held by the information processing device (host) 20 to the information storing device 30 and replacing the old revocation information of the information storing device 30 by the new data is executed.

If the revocation information 132 of the information storing device 30 is newer than the revocation information held by the information processing device (host) 20, update processing of outputting the revocation information 132 of the information storing device 30 to the information processing device (host) 20 and replacing the old revocation information of the information processing device (host) 20 by the new data is executed.

The information processing device 20 and the information storing device 30 carry out mutual authentication and sharing of a session key (=bus key (BK)) before the synchronization of the revocation information.

On condition of establishment of the mutual authentication, thereafter communication of confidential information between the information processing device (host) 20 and the information storing device 30 is performed with encryption by the session key (=bus key) or setting of signature data according to need.

Regarding the synchronization processing of the revocation information, the following three embodiment examples will be sequentially described below:

(Embodiment Example 1) processing example in which a Mac value for the version (Ver) of revocation information is generated and version check by MAC verification is performed, (Embodiment Example 2) processing example in which a signature (Sign) for the version (Ver) of revocation information is generated and version check by signature verification is performed, and (Embodiment Example 3) processing example in which a signature for data including the version (Ver) of revocation information is employed as a signature generated in mutual authentication and version check by verification of this signature is performed.

7-1. Embodiment Example 1

Processing Example in which A MAC Value for the Version (Ver) of Revocation Information is Generated and Version Check by MAC Verification is Performed First, as embodiment example 1, a processing example in which a message authentication code (MAC) for the version (Ver) of the revocation information is generated and version check by MAC verification is performed will be described.

Figure 10:
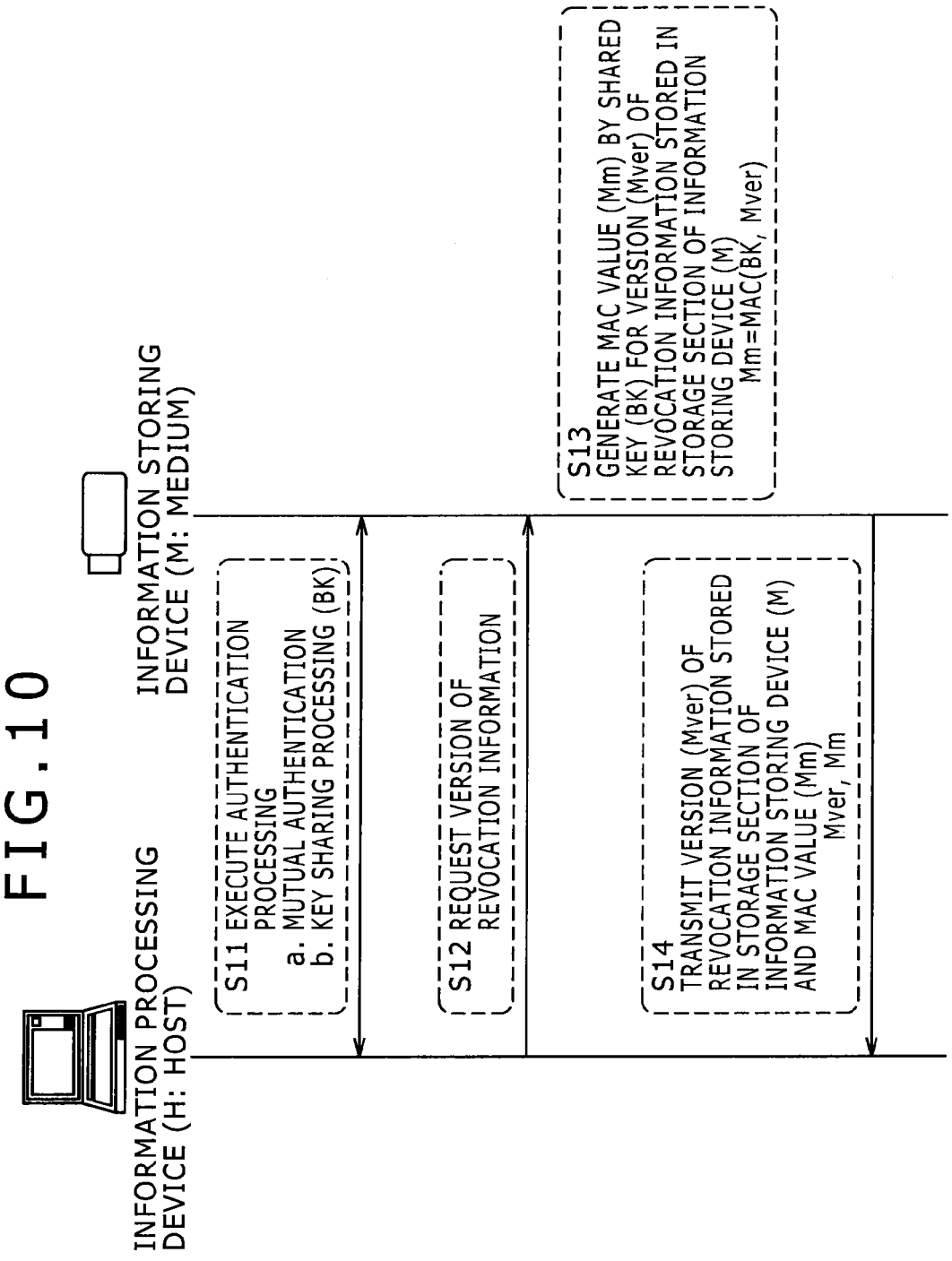
FIG. 10 is a diagram for explaining the sequence of mutual authentication and synchronization processing of the revocation information.

With reference to FIG. 10 and the subsequent drawings, a description will be made below about processing executed between an information processing device (H: host) that executes reproduction or recording processing of content and an information storing device (M: medium) that stores content.

In sequence diagrams of FIG. 10 and the subsequent drawings, the information processing device (H: host) is shown on the left side and the information storing device (M: medium) is shown on the right side. In addition, the processing executed between these two devices is shown along the time series.

Processing executed in the respective devices and communication processing shown in the sequence diagrams of FIG. 10 and the subsequent drawings are executed by the data processor of each device in accordance with a program stored in the storage section such as a RAM in advance for example.

The respective processing steps shown in the sequence diagrams of FIG. 10 and the subsequent drawings will be described below.

First, in a step S11,
mutual authentication processing is executed between the information processing device (H: host) and the information storing device (M: medium) loaded in the information processing device (H: host).

For example, mutual authentication and key sharing processing are carried out based on the ECDH cryptosystem compliant with a public key cryptographic algorithm.

The shared key will be referred to as the session key or bus key (BK). Hereinafter, the description will be made based on the assumption that the shared key is the bus key (BK).

In the mutual authentication processing in this step S11, public key certificates are exchanged between the pieces of the authentication equipment and the following processing is executed in both the pieces of equipment:

(a) verification processing of the validity of the public key certificate by signature verification of the public key certificate received from the counterpart equipment, (b) acquisition processing of the identifier (ID) of the counterpart equipment from the public key certificate whose validity has been confirmed, and (c) processing of checking that the identifier (ID) of the counterpart equipment acquired from the public key certificate is not registered in the revocation information held in the storage section of the self device.

When the revocation information is used, processing of verifying the signature set in the revocation information to check the validity of the revocation information is executed in advance.

In the mutual authentication processing in this step S11, the mutual authentication is not established e.g. in the following case, and the subsequent processing is canceled. That is, recording processing or reproduction processing of content is not executed.

(d) case in which the validity of the public key certificate is not confirmed by the signature verification of the public key certificate received from the counterpart equipment, or (e) case in which the identifier (ID) of the counterpart equipment acquired from the public key certificate is registered in the revocation information held in the storage section of the self device.

In the mutual authentication processing in the step S11, it is determined that the mutual authentication is established in the following case, and the processing sequence is forwarded to the next processing:

(f) the validity of the public key certificate is confirmed by the signature verification of the public key certificate received from the counterpart equipment, and (g) it is confirmed that the identifier (ID) of the counterpart equipment acquired from the public key certificate is not registered in the revocation information held in the storage section of the self device.

The processing of a step S12 and the subsequent steps is the synchronization processing (update processing) of the revocation information. In this processing, version comparison of the revocation information stored in each of two pieces of equipment, the information processing device (H: host) and the information storing device (M: medium) loaded in the information processing device (H: host), is performed. Furthermore, if the revocation information of an old version exists in either one of these pieces of equipment, the revocation information of the old version is replaced by the revocation information of the newer version in the other of the pieces of equipment.

The completion of this revocation information synchronization processing is not the condition of the start of recording or reproduction of content, and the information processing device (H: host) can start recording in the information storing device (M: medium) or content reproduction from the information storing device (M: medium) in response to establishment of the mutual authentication of the step S11.

In the next step S12, the information processing device (H: host) requests the information storing device (M: medium) to notify the version of the revocation information stored in the information storing device (M: medium).

Next, in a step S13, the information storing device (M: medium) generates a MAC value (Mm) by the shared key (BK) shared in the mutual authentication of the step S11 for the version (Mver) of the revocation information stored in the storage section of the information storing device (M). The MAC value (Mm) is generated in accordance with the following expression:

$$Mm = MAC(BK, Mver)$$

The version (Mver) of the revocation information is the version number (VSN) explained above with reference to FIG. 6. The version number having a larger value indicates that the revocation information is newer. In the synchronization processing of the revocation information, comparison processing of this version number (VSN) is executed.

Next, in a step S14, the information storing device (M: medium) transmits, to the information processing device (H: host), the version (Mver) of the revocation information stored in the storage section of the information storing device (M) and the generated MAC value (Mm).

Figure 11:
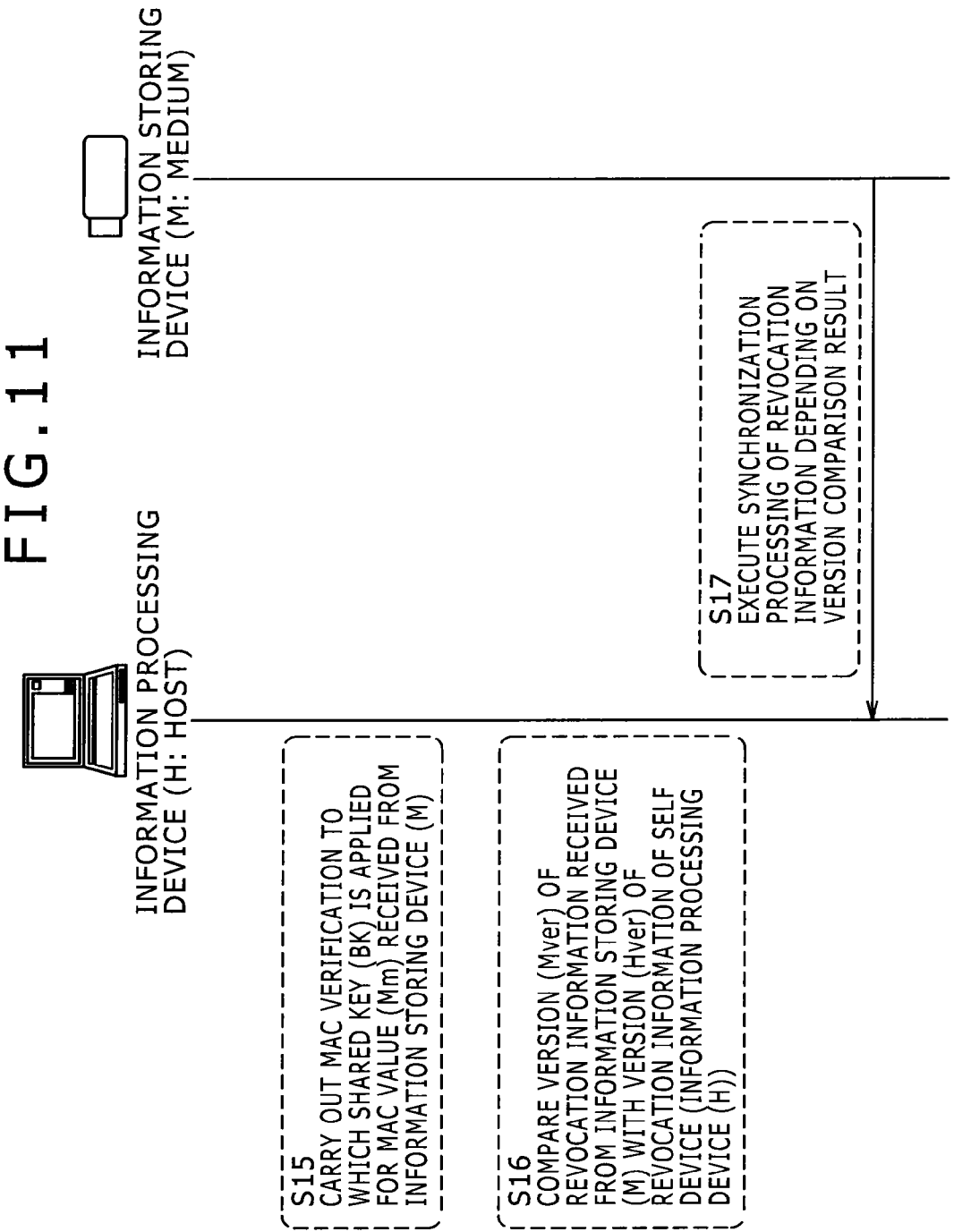
FIG. 11 is a diagram for explaining the sequence of the mutual authentication and the synchronization processing of the revocation information.

Next, in a step S15 shown in FIG. 11, the information processing device (H) carries out MAC verification to which the shared key (BK) is applied for the MAC value (Mm) received from the information storing device (M).

Specifically, the information processing device (H) compares the version (Mver) of the revocation information generated by applying the shared key (BK) to the MAC value (Mm) with the version (Mver) of the revocation information received from the information storing device (M) and verifies whether or not both correspond with each other.

If both correspond with each other, the verification is fulfilled and the information processing device (H) determines that the information storing device (M) has notified the correct version of the revocation information stored in the self device.

If the MAC verification is not fulfilled, the verification is not fulfilled and the information processing device (H) determines that the information storing device (M) has not notified the correct version of the revocation information stored in the self device. The subsequent processing is not executed.

That is, the synchronization processing (update processing) of the revocation information is not executed. Such setting that the shared key (BK) is abandoned and reproduction or recording of content is canceled in such a case may be employed.

If the MAC verification is fulfilled, the processing sequence is forwarded to a step S16.

In the step S16, the information processing device (H) compares the version (Mver) of the revocation information received from the information storing device (M) with the version (Hver) of the revocation information of the self device (information processing device (H)).

In a step S17, the synchronization processing (update processing) of the revocation information depending on the result of the version comparison in the step S16 is executed.

The synchronization processing (update processing) of the revocation information in the step S17 is executed in the following two cases as processing different for each of these cases:

(A) case in which the version (Mver) of the revocation information received from the information storing device (M) is newer than the version (Hver) of the revocation information of the information processing device (H), and (B) case in which the version (Mver) of the revocation information received from the information storing device (M) is older than the version (Hver) of the revocation information of the information processing device (H).

If the version (Mver) of the revocation information received from the information storing device (M) corresponds with the version (Hver) of the revocation information of the information processing device (H), notification of processing completion may be transmitted from the information processing device (H) to the information storing device (M) and the processing may be ended.

The sequences of the synchronization processing (update processing) of the revocation information in the above-described respective cases (A) and (B) will be described below with reference to FIG. 12 and the subsequent drawings.

((A) Revocation information synchronization processing in the case in which the version (Mver) of the revocation information received from the information storing device (M) is newer than the version (Hver) of the revocation information of the information processing device (H))

First, with reference to FIG. 12, a description will be made below about the revocation information synchronization processing in the case in which the version (Mver) of the revocation information received from the information storing device (M) is newer than the version (Hver) of the revocation information of the information processing device (H).

First, in a step S21,
the information processing device (H) requests the information storing device (M) to transmit the revocation information (Request Revocation List).

Next, in a step S22,
the information storing device (M) acquires the revocation information (Revocation List) from the storage section and transmits it to the information processing device (H).

Next, in a step S23,
the information processing device (H) determines whether or not the version of the revocation information (Revocation List) acquired from the information storing device (M) corresponds with the version for which the MAC verification has been carried out in the step S15.

If they do not correspond with each other, the information processing device (H) determines that the information storing device (M) has not transmitted the revocation information (Revocation List) of the correct new version, and the subsequent processing is canceled.

That is, the synchronization processing (update processing) of the revocation information is not executed. Such setting that the shared key (BK) is abandoned and reproduction or recording of content is canceled in such a case may be employed.

If they correspond with each other, the processing sequence is forwarded to the next processing.

Next, in a step S24,
the information processing device (H) carries out signature verification of the revocation information (Revocation List) acquired from the information storing device (M).

As described above with reference to FIG. 6, a signature generated by the private key of the certificate authority is set in the revocation information (Revocation List).

The information processing device (H) carries out this signature verification by applying the public key of the certificate authority stored in the storage section.

If the signature verification succeeds, the information processing device (H) determines that the revocation information (Revocation List) is valid information free from the falsification.

If the signature verification fails, the information processing device (H) determines that possibly the revocation information (Revocation List) is falsified invalid information, and the subsequent processing is canceled.

That is, the synchronization processing (update processing) of the revocation information is not executed. Such setting that the shared key (BK) is abandoned and reproduction or recording of content is canceled in such a case may be employed.

If the signature verification succeeds, the processing sequence is forwarded to a step S25.

In the step S25,
the information processing device (H) executes update processing of replacing the old revocation information stored in the storage section of the information processing device by the revocation information (Revocation List) acquired from the information storing device (M).

By the above-described processing, the revocation information synchronization processing is completed.

((B) Revocation information synchronization processing in the case in which the version (Mver) of the revocation information received from the information storing device (M) is older than the version (Hver) of the revocation information of the information processing device (H))

Next, with reference to FIG. 13 and FIG. 14, a description will be made below about the revocation information synchronization processing in the case in which the version (Mver) of the revocation information received from the information storing device (M) is older than the version (Hver) of the revocation information of the information processing device (H).

First, in a step S31,
the information processing device (H) transmits the revocation information (Revocation List) to the information storing device (M).

Next, in a step S32,
the information storing device (M) checks whether or not the version of the revocation information (Revocation List) acquired from the information processing device (H) is newer than the version of the revocation information (Revocation List) stored in the self device.

If it is not newer, the information storing device (M) determines that the information processing device (H) has not transmitted the revocation information (Revocation List) of the correct new version, and the subsequent processing is canceled.

That is, the synchronization processing (update processing) of the revocation information is not executed. Such setting that the shared key (BK) is abandoned and reproduction or recording of content is canceled in such a case may be employed.

If it is determined that the version of the received revocation information is newer, the processing sequence is forwarded to the next processing.

Next, in a step S33,
the information storing device (M) carries out signature verification of the revocation information (Revocation List) acquired from the information processing device (H).

As described above with reference to FIG. 6, a signature generated by the private key of the certificate authority is set in the revocation information (Revocation List).

The information storing device (M) carries out this signature verification by applying the public key of the certificate authority stored in the storage section.

If the signature verification succeeds, the information storing device (M) determines that the revocation information (Revocation List) is valid information free from the falsification.

If the signature verification fails, the information storing device (M) determines that possibly the revocation information (Revocation List) is falsified invalid information, and the subsequent processing is canceled.

That is, the synchronization processing (update processing) of the revocation information is not executed. Such setting that the shared key (BK) is abandoned and reproduction or recording of content is canceled in such a case may be employed.

If the signature verification succeeds, the processing sequence is forwarded to a step S34.

In the step S34,
the information storing device (M) executes update processing of replacing the old revocation information stored in the storage section in the information storing device (M) by the revocation information (Revocation List) acquired from the information processing device (H).

Figure 14:
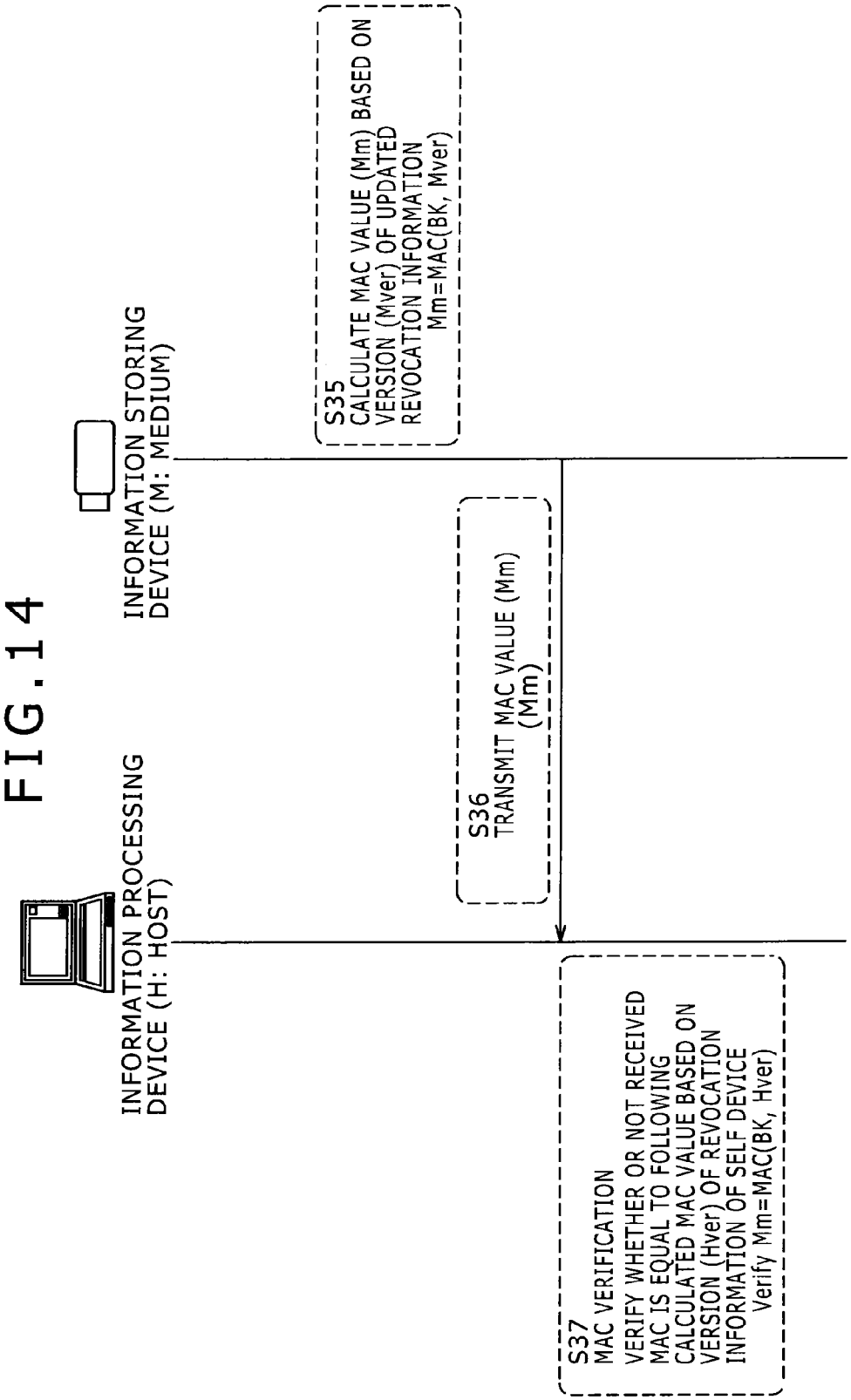
FIG. 14 is a diagram for explaining the sequence of the mutual authentication and the synchronization processing of the revocation information.

Next, in a step S35 in FIG. 14,
the information storing device (M) reads the version (Mver) of the revocation information (Revocation List) of the new version, which is updated in the step S34 and newly stored in the storage section, and generates a MAC value (Mm) based on the shared key (BK).

The MAC value (Mm) is generated in accordance with the following expression:

$$Mm = MAC(BK, Mver)$$

Next, in a step S36,
the information storing device (M: medium) transmits the generated MAC value (Mm) to the information processing device (H: host).

Next, in a step S37,
the information processing device (H) carries out Mac verification to which the shared key (BK) is applied for the MAC value (Mm) received from the information storing device (M).

Specifically, the information processing device (H) calculates a MAC value obtained by applying the shared key (BK) for the version (Hver) of the revocation information stored in the information processing device (H), and determines whether or not the calculated value corresponds with the MAC value (Mm) received from the information storing device (M). That is, verification processing in accordance with the following expression is executed:

$$\text{Verify } Mm = MAC(BK, Hver)$$

If the calculated MAC value does not correspond with the received MAC value (Mm), the information processing device (H) determines that the information storing device (M) has not executed the synchronization processing (update processing) of correctly storing the revocation information (Revocation List) of the new version transmitted by the information processing device (H) in the storage section of the information storing device (M).

In this case, the subsequent processing is canceled. Such setting that the shared key (BK) is abandoned and reproduction or recording of content is canceled in such a case may be employed.

If the calculated MAC value corresponds with the received MAC value (Mm), the information processing device (H) determines that the information storing device (M) has executed the synchronization processing (update processing) of correctly storing the revocation information (Revocation List) of the new version transmitted by the information processing device (H) in the storage section of the information storing device (M), and ends the processing.

By the above-described processing, the revocation information synchronization processing is completed.

7-2. Embodiment Example 2

Figure 15:
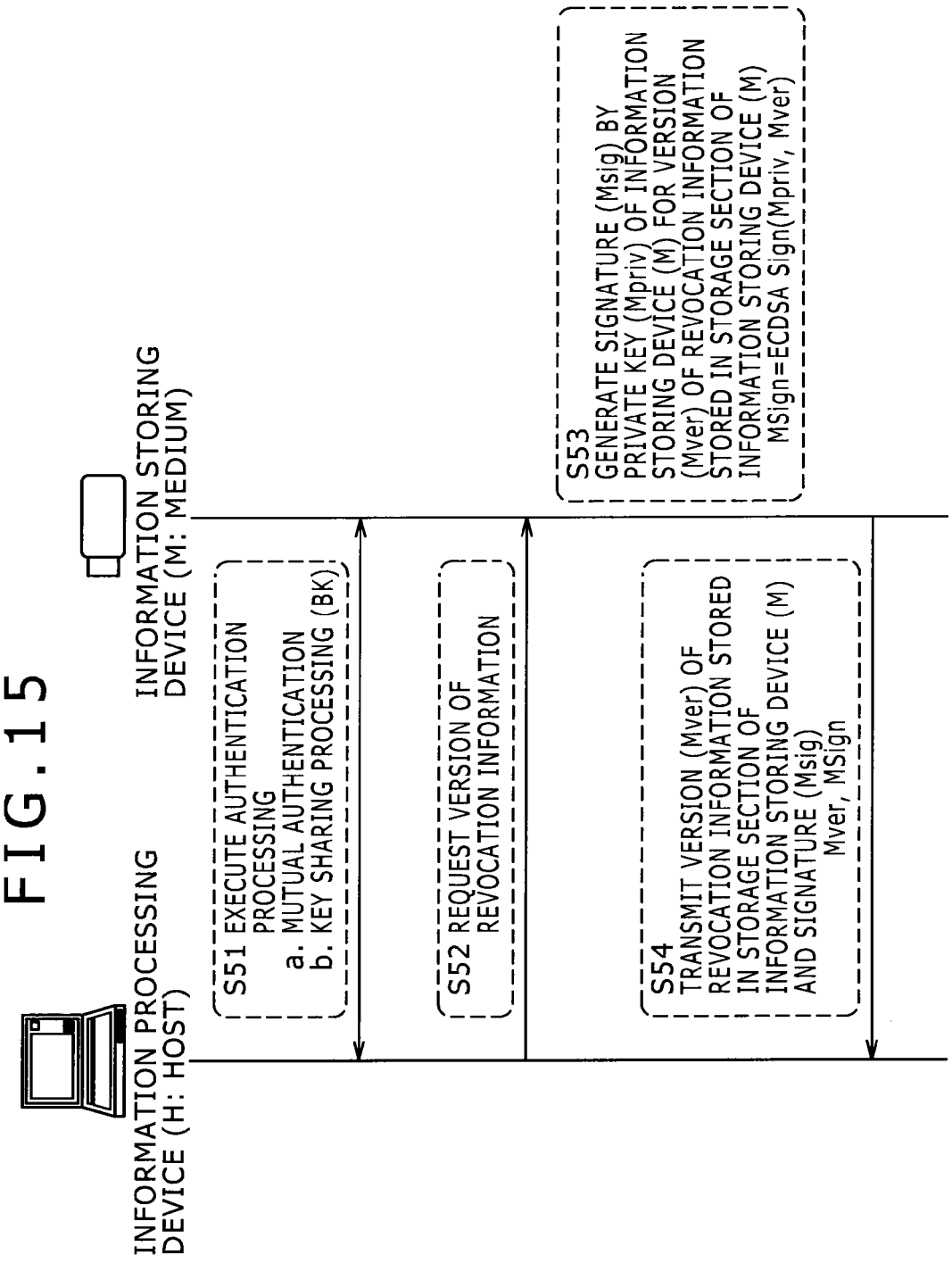
FIG. 15 is a diagram for explaining the sequence of the mutual authentication and the synchronization processing of the revocation information.

Processing Example in which a Signature (Sign) for the Version (Ver) of Revocation Information is Generated and Version Check by Signature Verification is Performed As embodiment example 2, a processing example in which a digital signature (Sign) for the version (Ver) of the revocation information is generated and version check by signature verification is performed will be described with reference to FIG. 15 and the subsequent drawings.

The respective processing steps shown in the sequence diagrams of FIG. 15 and the subsequent drawings will be described below.

First, in a step S51,
mutual authentication processing is executed between an information processing device (H: host) and an information storing device (M: medium) loaded in the information processing device (H: host).

For example, mutual authentication and key sharing processing are carried out based on the ECDH cryptosystem compliant with a public key cryptographic algorithm.

The description will be made based on the assumption that the shared key is the bus key (BK) similarly to the above-described embodiment example 1.

The mutual authentication processing in this step S51 is the same as that in the above-described embodiment example 1. In this processing, public key certificates are exchanged between the pieces of the authentication equipment and the following processing is executed in both the pieces of equipment:

(a) verification processing of the validity of the public key certificate by signature verification of the public key certificate received from the counterpart equipment, (b) acquisition processing of the identifier (ID) of the counterpart equipment from the public key certificate whose validity has been confirmed, and (c) processing of checking that the identifier (ID) of the counterpart equipment acquired from the public key certificate is not registered in the revocation information held in the storage section of the self device.

When the revocation information is used, processing of verifying the signature set in the revocation information to check the validity of the revocation information is executed in advance.

In the mutual authentication processing in this step S51, the mutual authentication is not established e.g. in the following case, and the subsequent processing is canceled. That is, recording processing or reproduction processing of content is not executed.

(d) case in which the validity of the public key certificate is not confirmed by the signature verification of the public key certificate received from the counterpart equipment, or (e) case in which the identifier (ID) of the counterpart equipment acquired from the public key certificate is registered in the revocation information held in the storage section of the self device.

In the mutual authentication processing in the step S51, it is determined that the mutual authentication is established in the following case, and the processing sequence is forwarded to the next processing:

(f) the validity of the public key certificate is confirmed by the signature verification of the public key certificate received from the counterpart equipment, and (g) it is confirmed that the identifier (ID) of the counterpart equipment acquired from the public key certificate is not registered in the revocation information held in the storage section of the self device.

The processing of a step S52 and the subsequent steps is the synchronization processing (update processing) of the revocation information. In this processing, version comparison of the revocation information stored in each of two pieces of equipment, the information processing device (H: host) and the information storing device (M: medium) loaded in the information processing device (H: host), is performed. Furthermore, if the revocation information of an old version exists in either one of these pieces of equipment, the revocation information of the old version is replaced by the revocation information of the newer version in the other of the pieces of equipment.

The completion of this revocation information synchronization processing is not the condition of the start of recording or reproduction of content, and the information processing device (H: host) can start recording in the information storing device (M: medium) or content reproduction from the information storing device (M: medium) in response to establishment of the mutual authentication of the step S51.

In the next step S52,
the information processing device (H: host) requests the information storing device (M: medium) to notify the version of the revocation information stored in the information storing device (M: medium).

Next, in a step S53,
the information storing device (M: medium) generates a digital signature (Msig) by digital signature processing to which the private key (Mpriv) stored in the storage section of the information storing device (M) is applied for the version (Mver) of the revocation information stored in the storage section of the information storing device (M). The digital signature (Msig) is generated in accordance with the following expression:

$$Msig = ECDSA\ Sign(Mpriv, Mver)$$

The version (Mver) of the revocation information is the version number (VSN) explained above with reference to FIG. 6. The version number having a larger value indicates that the revocation information is newer. In the synchronization processing of the revocation information, comparison processing of this version number (VSN) is executed.

Next, in a step S54,
the information storing device (M: medium) transmits, to the information processing device (H: host), the version (Mver) of the revocation information stored in the storage section of the information storing device (M) and the generated signature (Msig).

Figure 16:
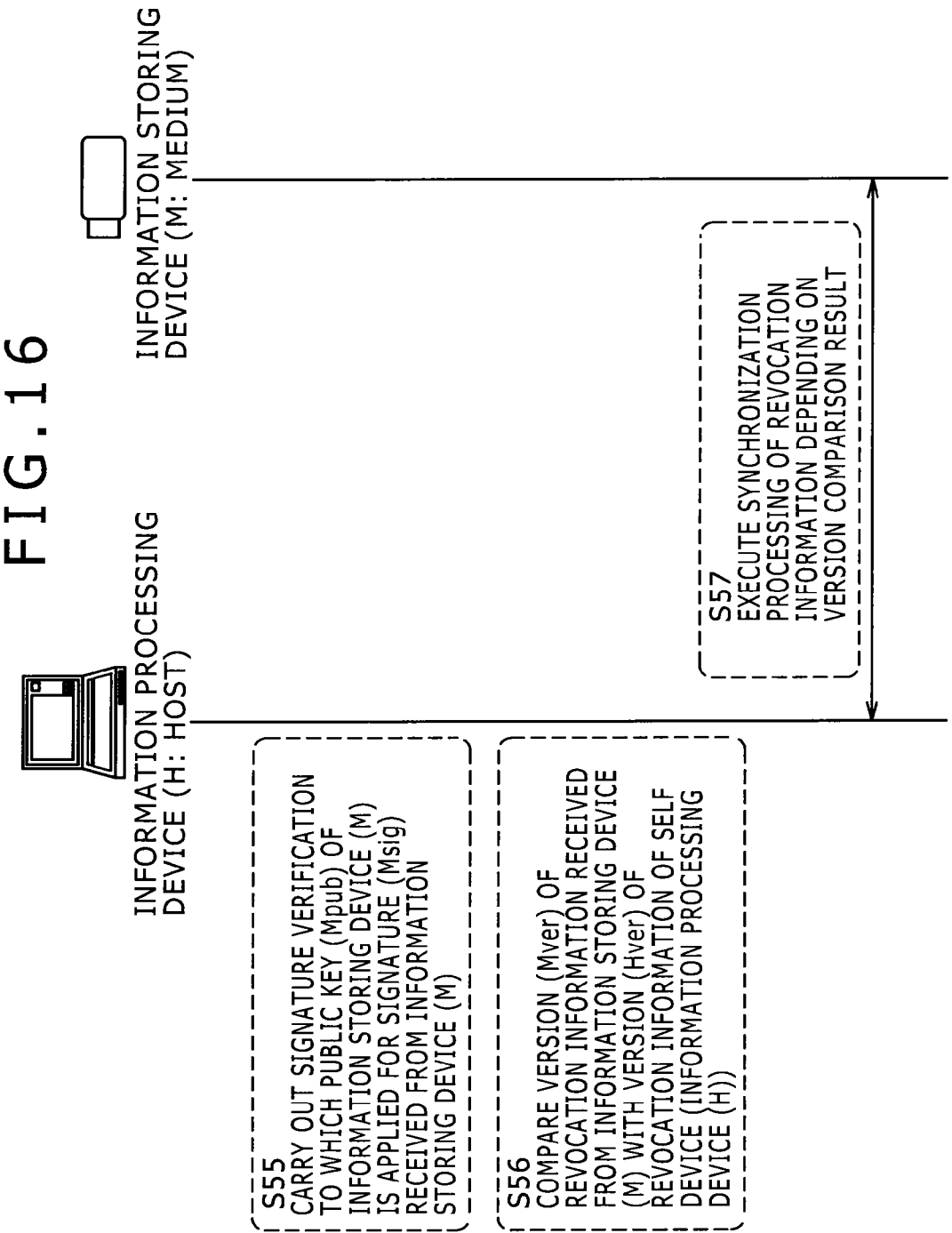
FIG. 16 is a diagram for explaining the sequence of the mutual authentication and the synchronization processing of the revocation information.

Next, in a step S55 shown in FIG. 16,
the information processing device (H) carries out signature verification to which the public key (Mpub) of the information storing device (M) is applied for the signature (Msig) received from the information storing device (M). The public key (Mpub) of the information storing device (M) can be acquired from the public key certificate received from the information storing device (M) in the authentication processing of the step S51.

If the signature verification is fulfilled, the information processing device (H) determines that the information storing device (M) has notified the correct version of the revocation information stored in the self device.

If the signature verification is not fulfilled, the verification is not fulfilled and the information processing device (H) determines that the information storing device (M) has not notified the correct version of the revocation information stored in the self device. The subsequent processing is not executed.

That is, the synchronization processing (update processing) of the revocation information is not executed. Such setting that the shared key (BK) is abandoned and reproduction or recording of content is canceled in such a case may be employed.

If the signature verification is fulfilled, the processing sequence is forwarded to a step S56.

In the step S56,
the information processing device (H) compares the version (Mver) of the revocation information received from the information storing device (M) with the version (Hver) of the revocation information of the self device (information processing device (H)).

In a step S57,
the synchronization processing (update processing) of the revocation information depending on the result of the version comparison in the step S56 is executed.

The synchronization processing (update processing) of the revocation information in the step S57 is executed in the following two cases as processing different for each of these cases, similarly to the above embodiment example 1:

(A) case in which the version (Mver) of the revocation information received from the information storing device (M) is newer than the version (Hver) of the revocation information of the information processing device (H), and (B) case in which the version (Mver) of the revocation information received from the information storing device (M) is older than the version (Hver) of the revocation information of the information processing device (H).

If the version (Mver) of the revocation information received from the information storing device (M) corresponds with the version (Hver) of the revocation information of the information processing device (H), notification of processing completion may be transmitted from the information processing device (H) to the information storing device (M) and the processing may be ended.

Figure 12:
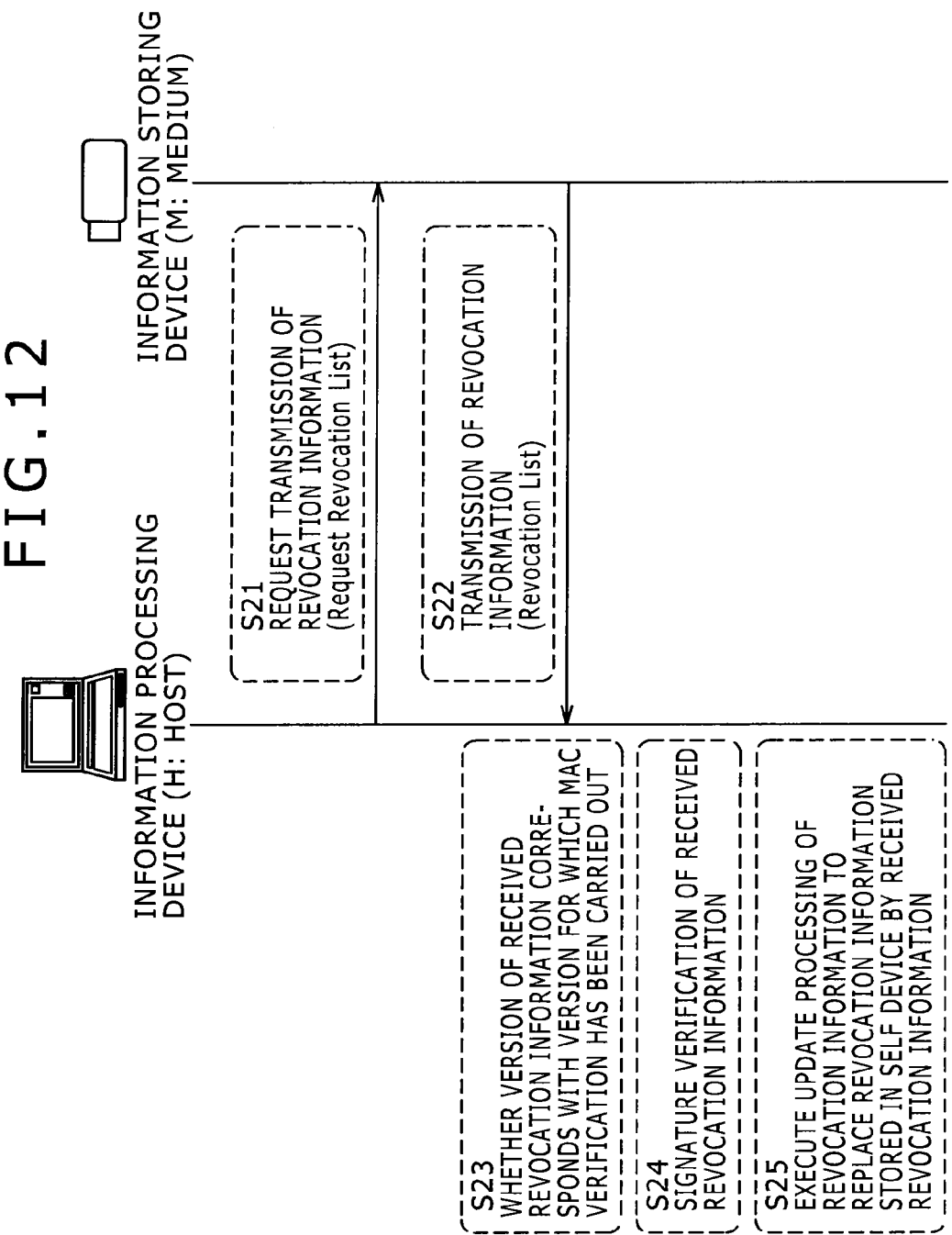
FIG. 12 is a diagram for explaining the sequence of the mutual authentication and the synchronization processing of the revocation information.
Figure 13:
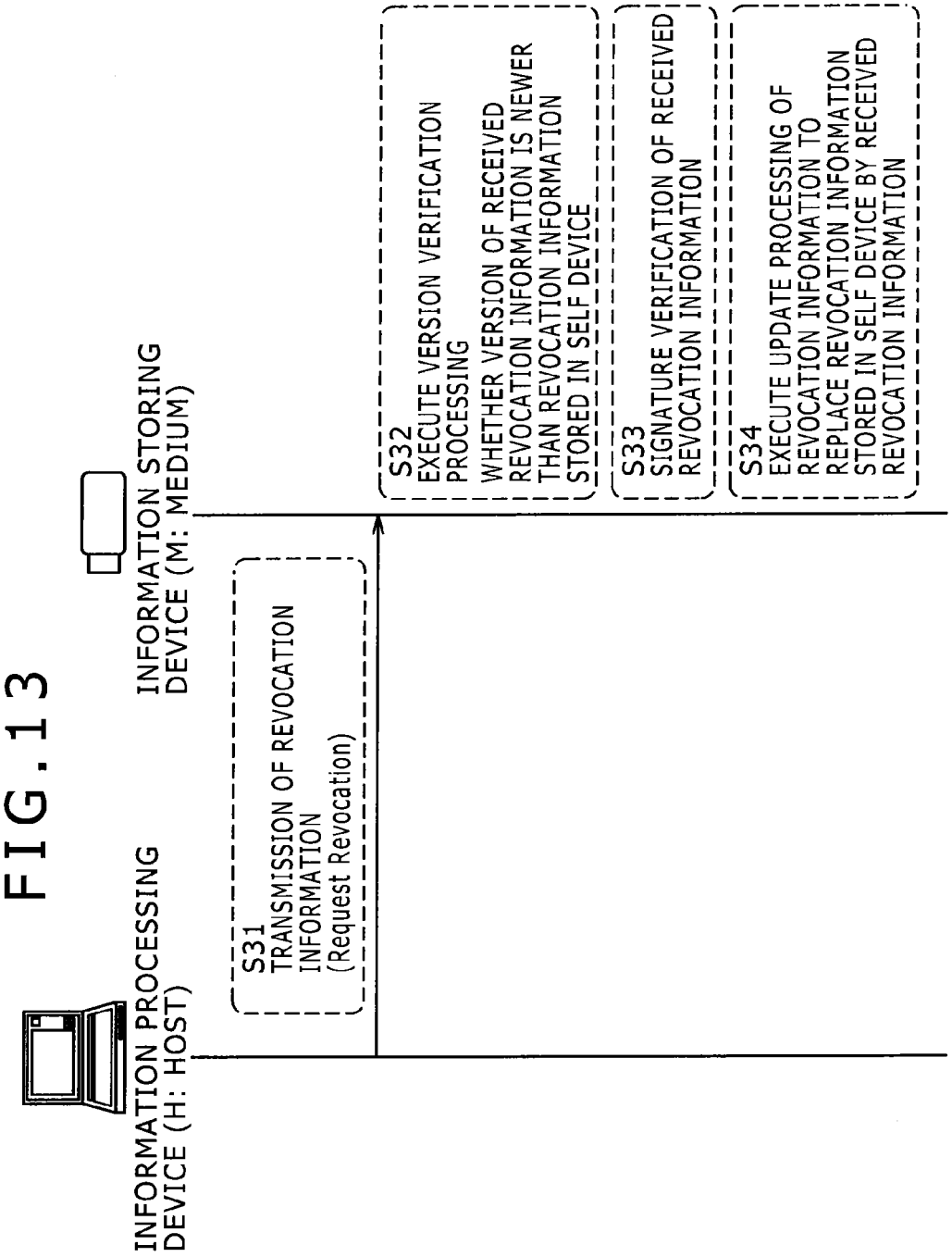
FIG. 13 is a diagram for explaining the sequence of the mutual authentication and the synchronization processing of the revocation information.

The sequences of the synchronization processing (update processing) of the revocation information in the above-described respective cases (A) and (B) are the same as those of the processing explained above for the embodiment example 1 with reference to FIG. 12 to FIG. 14. Therefore, description thereof is omitted.

The MAC value generation and the MAC value verification processing of the steps S35 to S37 in FIG. 14 may be replaced by signature generation and signature verification processing.

7-3. Embodiment Example 3

Figure 17:
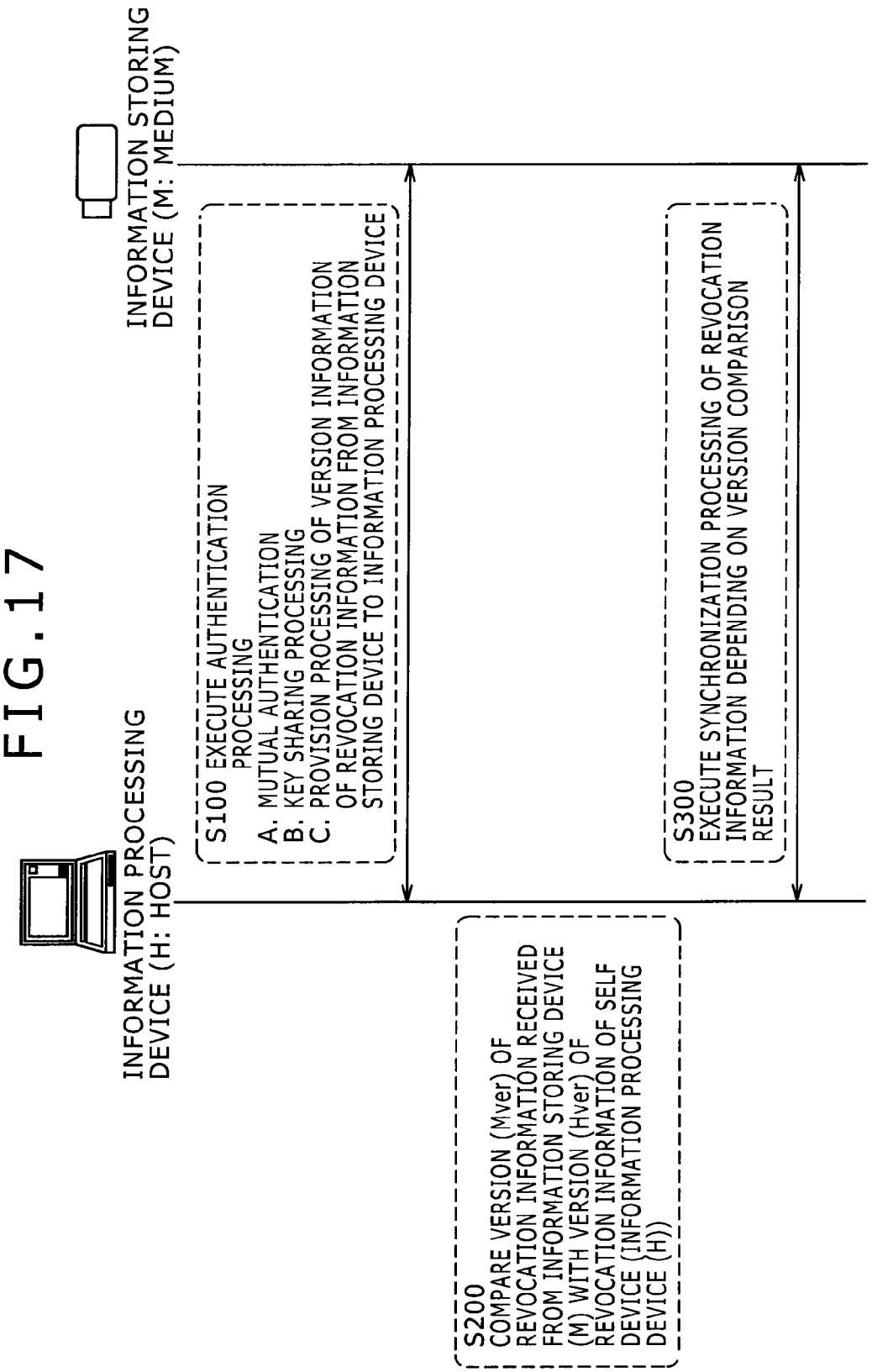
FIG. 17 is a diagram for explaining the sequence of the mutual authentication and the synchronization processing of the revocation information.

Processing Example in which a Signature for Data Including the Version (Ver) of Revocation Information is Employed as a Signature Generated in Mutual Authentication and Version Check by Verification of this Signature is Performed As embodiment example 3, a processing example in which a signature for data including the version (Ver) of revocation information is employed as a digital signature generated in mutual authentication and version check by verification of this signature is performed will be described with reference to sequence diagrams of FIG. 17 and the subsequent drawings.

FIG. 17 is a diagram for explaining the whole sequence in the present embodiment example.

Figure 18:
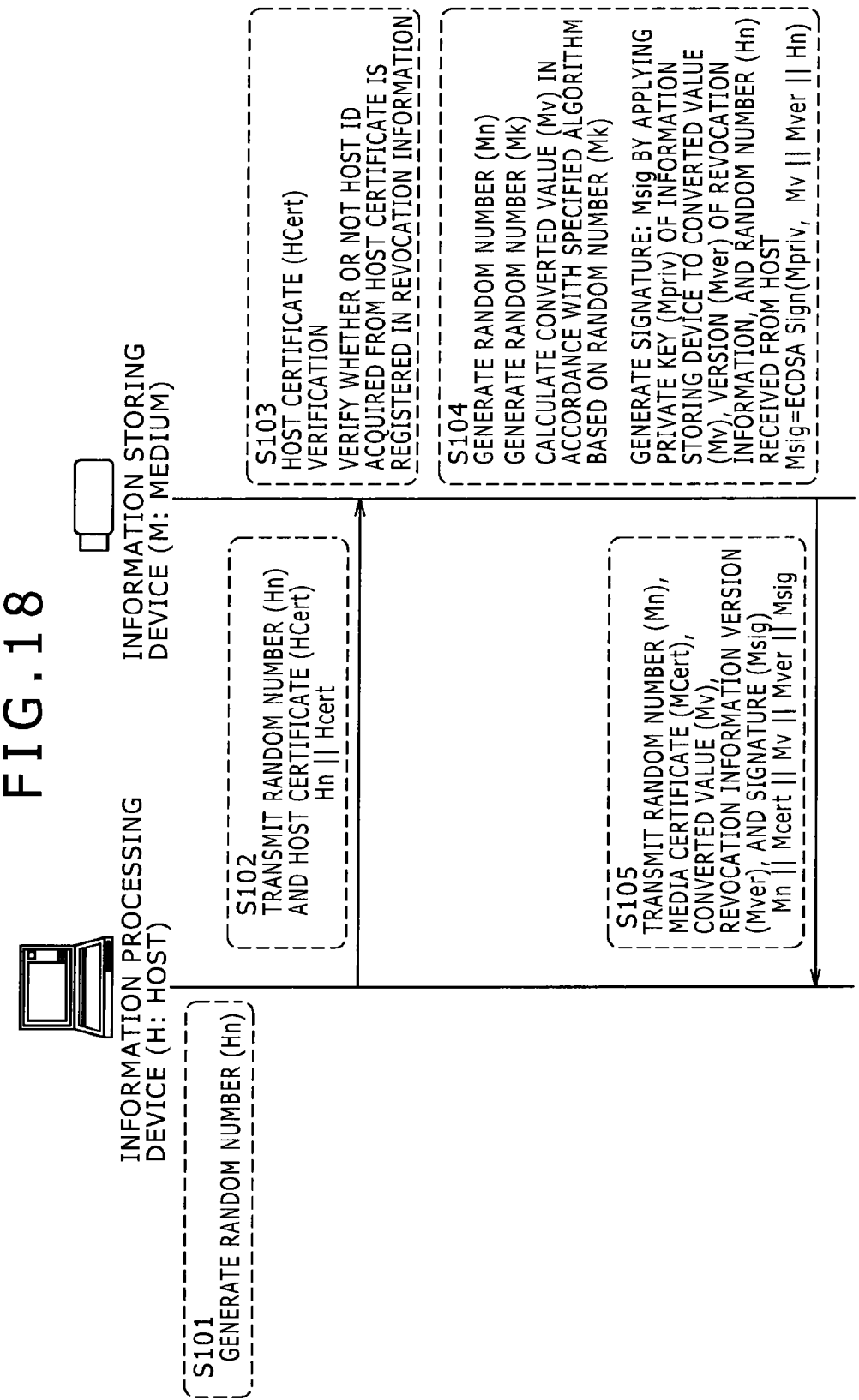
FIG. 18 is a diagram for explaining the detailed sequence of mutual authentication processing executed in the sequence of the mutual authentication and the synchronization processing of the revocation information.
Figure 19:
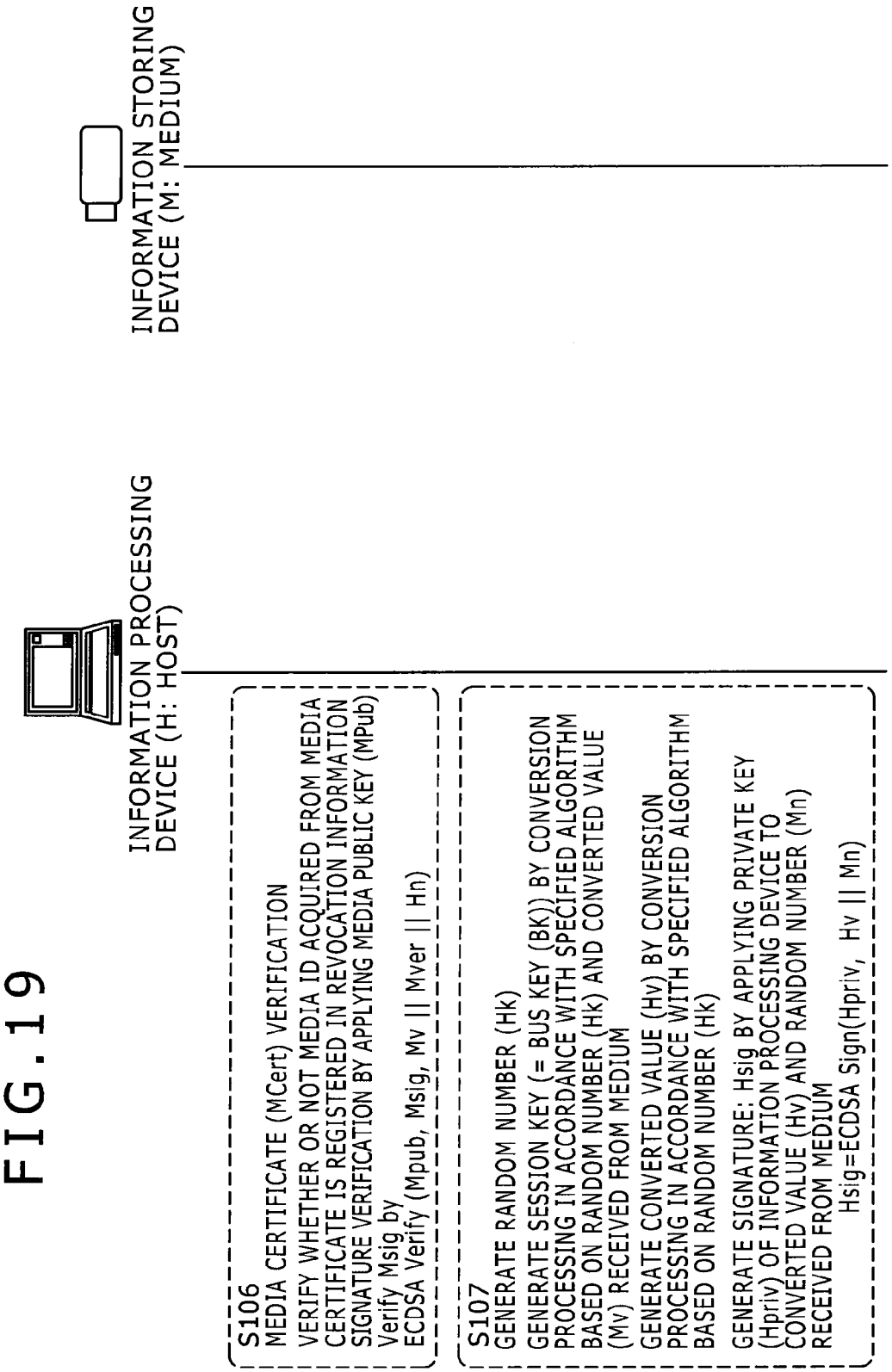
FIG. 19 is a diagram for explaining the detailed sequence of the mutual authentication processing executed in the sequence of the mutual authentication and the synchronization processing of the revocation information.
Figure 20:
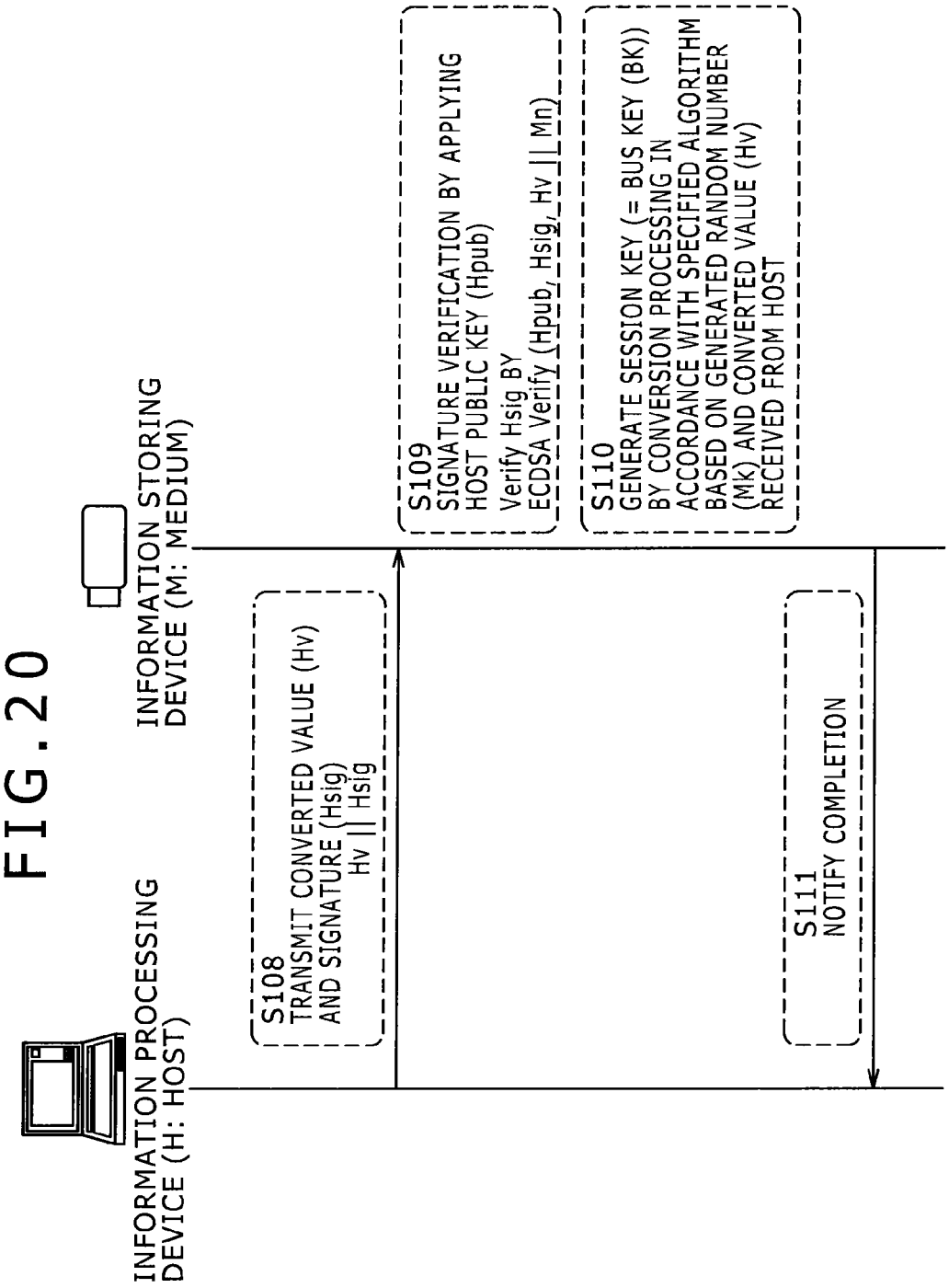
FIG. 20 is a diagram for explaining the detailed sequence of the mutual authentication processing executed in the sequence of the mutual authentication and the synchronization processing of the revocation information.

FIG. 18, FIG. 19, and FIG. 20 are diagrams for explaining the detailed sequence of mutual authentication processing of a step S100 shown in FIG. 17.

The whole sequence of FIG. 17 will be first described.

In the step S100,
the mutual authentication processing is executed between an information processing device (H: host) and an information storing device (M: medium) loaded in the information processing device (H: host).

This mutual authentication processing is mutual authentication and key sharing processing based on the ECDH cryptosystem compliant with a public key cryptographic algorithm for example.

However, in this authentication processing, signature data for data including the version (Ver) of the revocation information is employed as the signature data transmitted and received between two devices.

Specifically, in the mutual authentication processing of the step S100 in the present embodiment example, in addition to the following processing (A) and processing (B), the following processing (C) is executed.

(A) mutual authentication (B) key sharing processing (C) processing of providing version information of the revocation information from the information storing device (M) to the information processing device (H)

Details of this authentication processing sequence will be described later with reference to FIG. 18 and the subsequent drawings.

If the mutual authentication of the step S100 is not established, the subsequent processing is not executed. That is, the synchronization processing of the revocation information is canceled. Furthermore, reproduction processing or recording processing of content is also not executed.

If the mutual authentication of the step S100 is established, processing of a step S200 and the subsequent step is executed.

The processing of the step S200 and the subsequent step is the synchronization processing (update processing) of the revocation information. In this processing, version comparison of the revocation information stored in each of two pieces of equipment, the information processing device (H: host) and the information storing device (M: medium) loaded in the information processing device (H: host), is performed. Furthermore, if the revocation information of an old version exists in either one of these pieces of equipment, the revocation information of the old version is replaced by the revocation information of the newer version in the other of the pieces of equipment.

The completion of this revocation information synchronization processing is not the condition of the start of recording or reproduction of content, and the information processing device (H: host) can start recording in the information storing device (M: medium) or content reproduction from the information storing device (M: medium) in response to establishment of the mutual authentication of the step S100.

The step S200 is processing of version comparison of the revocation information stored in two devices, executed in the information processing device (H).

In the present processing example, the following setting is employed. Specifically, in the mutual authentication processing in the step S100, a signature for data including the version (Mver) of the revocation information held by the information storing device (M) is employed as signature data transmitted by the information storing device (M) to the information processing device (H). Furthermore, in this signature transmission, the version (Mver) of the revocation information held by the information storing device (M) is also transmitted from the information storing device (M) to the information processing device (H).

In the step S200, comparison processing is executed between the version (Mver) of the revocation information that is received from the information storing device (M) in the mutual authentication processing in the step S100 and held by the information storing device (M) and the version (Hver) of the revocation information stored in the storage section of the information processing device (H).

Next, in a step S300, the synchronization processing (update processing) of the revocation information depending on the result of the version comparison in the step S200 is executed.

The synchronization processing (update processing) of the revocation information in the step S300 is executed in the following two cases as processing different for each of these cases, similarly to the above embodiment examples 1 and 2:

(A) case in which the version (Mver) of the revocation information received from the information storing device (M) is newer than the version (Hver) of the revocation information of the information processing device (H), and (B) case in which the version (Mver) of the revocation information received from the information storing device (M) is older than the version (Hver) of the revocation information of the information processing device (H).

If the version (Mver) of the revocation information received from the information storing device (M) corresponds with the version (Hver) of the revocation information of the information processing device (H), notification of processing completion may be transmitted from the information processing device (H) to the information storing device (M) and the processing may be ended.

The sequences of the synchronization processing (update processing) of the revocation information in the above-described respective cases (A) and (B) are the same as those of the processing explained above for the embodiment example 1 with reference to FIG. 12 to FIG. 14.

The detailed sequence of the mutual authentication processing of the step S100 will be described with reference to FIG. 18 to FIG. 20.

As described above, in the mutual authentication processing of the step S100 in the present embodiment example, in addition to the following processing (A) and processing (B), the following processing (C) is executed.

(A) mutual authentication (B) key sharing processing (C) processing of providing version information of the revocation information from the information storing device (M) to the information processing device (H)

Details of this authentication processing sequence will be described with reference to FIG. 18 and the subsequent drawings. The mutual authentication processing shown in FIG. 18 and the subsequent drawings is mutual authentication and key sharing processing based on e.g. the ECDH cryptosystem compliant with a public key cryptographic algorithm similarly to the above-described embodiment examples 1 and 2. However, in this authentication processing, signature data for data including the version (Ver) of the revocation information is employed as the signature data transmitted and received between two devices.

First, in a step S101 shown in FIG. 18, the information processing device (H) generates a random number (Hn).

Next, in a step S102, the information processing device (H) transmits the generated random number (Hn) and the public key certificate (HCert) of the information processing device (H).

It is to be noted that symbol (A||B) shown in the drawings means linked data of A and B.

Next, in a step S103, the information storing device (M) carries out signature verification of the public key certificate (HCert) of the information processing device (H).

As described above with reference to FIG. 7 and FIG. 9, a signature by the private key of the certificate authority is set in the public key certificate.

The information storing device (M) carries out the signature verification by applying the public key of the certificate authority stored in the storage section.

If the signature verification does not succeed and the validity of the public key certificate (HCert) of the information processing device (H) is not confirmed, the processing is stopped. That is, the subsequent revocation information synchronization processing and reproduction or recording processing of content are not executed.

If the signature verification succeeds and the validity of the public key certificate (HCert) of the information processing device (H) is confirmed, the information storing device (M) acquires the identifier (ID) of the information processing device (H) from the public key certificate (HCert) of the information processing device (H) and checks whether this ID is not registered in the revocation information stored in the storage section of the information storing device (M).

If the ID of the information processing device (H) is registered in the revocation information, the information storing device (M) determines that the information processing device (H) is unauthorized equipment and the subsequent processing is canceled. That is, the subsequent revocation information synchronization processing and reproduction or recording processing of content are not executed.

If the ID of the information processing device (H) is not registered in the revocation information, the information storing device (M) determines that the information processing device (H) is valid equipment and proceeds to the next processing.

In the next step S104, the information storing device (M) executes the following processing:

generating a random number (Mn), generating a random number (Mk), calculating a converted value (Mv) in accordance with a specified algorithm based on the random number (Mk), and generating a signature: Msig in accordance with the following expression by applying the private key (Mpriv) of the information storing device to the converted value (Mv), the version (Mver) of the revocation information stored in the storage section of the information storing device (M), and the random number (Mn) received from the host.

$$Msig = ECDSA\ Sign(Mpriv, Mv\|Mver\|Hn)$$

Next, in a step S105, the information storing device (M) transmits, to the information processing device (H), linked data of the generated random number (Mn), the public key certificate (MCert) of the information storing device (M), the generated converted value (Mv), the version (Mver) of the revocation information stored in the storage section of the information storing device (M), and the signature (Msig) generated in the step S104.

That is, the following data is transmitted.

$$Mn\|Mcert\|Mv\|Mver\|Msig$$

Next, in a step S106 shown in FIG. 19, the information processing device (H) carries out signature verification of the public key certificate (MCert) of the information storing device (M).

As described above with reference to FIG. 7 and FIG. 9, a signature by the private key of the certificate authority is set in the public key certificate.

The information processing device (H) carries out the signature verification by applying the public key of the certificate authority stored in the storage section.

If the signature verification does not succeed and the validity of the public key certificate (MCert) of the information storing device (M) is not confirmed, the processing is stopped. That is, the subsequent revocation information synchronization processing and reproduction or recording processing of content are not executed.

If the signature verification succeeds and the validity of the public key certificate (MCert) of the information storing device (M) is confirmed, the information processing device (H) acquires the identifier (ID) of the information storing device (M) from the public key certificate (MCert) of the information storing device (M) and checks whether this ID is not registered in the revocation information stored in the storage section of the information processing device (H).

If the ID of the information storing device (M) is registered in the revocation information, the information processing device (H) determines that the information storing device (M) is unauthorized equipment and the subsequent processing is canceled. That is, the subsequent revocation information synchronization processing and reproduction or recording processing of content are not executed.

If the ID of the information storing device (M) is not registered in the revocation information, the information processing device (H) determines that the information storing device (M) is valid equipment, and furthermore carries out signature verification of the signature (Msig) received from the information storing device (M).

The signature verification processing is executed in accordance with the following expression as processing to which the public key (Mpub) of the information storing device (M) acquired from the public key certificate (MCert) of the information storing device (M) is applied.

Verify Msig by ECDSA $$Verify(Mpub, Msig, Mv\|Mver\|Hn)$$

If the signature verification processing is not fulfilled, the information processing device (H) determines that the received data from the information storing device (M) is invalid data and cancels the subsequent processing. That is, the subsequent revocation information synchronization processing and reproduction or recording processing of content are not executed.

If the signature verification processing is fulfilled, the information processing device (H) determines that the received data from the information storing device (M) is valid data and proceeds to the next processing.

In a step S107, the information processing device (H) executes the following processing:

generating a random number (Hk), generating a session key (=bus key (BK)) as a shared key by conversion processing in accordance with a specified algorithm based on the random number (Hk) and the converted value (Mv) received from the medium, generating a converted value (Hv) by conversion processing in accordance with a specified algorithm based on the random number (Hk), and generating a signature (Hsig) in accordance with the following expression by applying the private key (Hpriv) of the information processing device (H) to the converted value (Hv) and the random number (Mn) received from the medium.

$$Hsig = ECDSA\ Sign(Hpriv, Hv\|Mn)$$

Next, in a step S108 shown in FIG. 20, the information processing device (H) transmits, to the information storing device (M), linked data of the generated converted value (Hv) and the signature (Hsig), i.e. the following data.

$$Hv\|Msig$$

Next, in a step S109, the information storing device (M) carries out signature verification for the signature (Hsig) received from the information processing device (H).

This signature verification is executed in accordance with the following expression by applying the public key (Hpub) of the information processing device (H), stored in the public key certificate (HCert) received from the information processing device (H).

Verify Hsig by ECDSA

Verify($Hpub, Hsig, Hv \| Mn$)

If the signature verification does not succeed, the processing is stopped. That is, the subsequent revocation information synchronization processing and reproduction or recording processing of content are not executed.

If the signature verification succeeds, the processing sequence is forwarded to the next processing.

Next, in a step S110, the information storing device (M) generates a session key (=bus key (BK)) as a shared key by conversion processing in accordance with a specified algorithm based on the generated random number (Mk) generated in the step S104 and the converted value (Hv) received from the host.

At last, in a step S111, the information storing device (M) notifies the information processing device (H) of the completion of the processing and ends the processing.

In the present embodiment example, the mutual authentication processing of the step S100 shown in FIG. 17 is executed in accordance with the processing explained with reference to FIG. 18 to FIG. 20.

The processing of version comparison of the revocation information in the step S200 shown in FIG. 17 is executed by applying the version (Mver) transmitted by the information storing device (M) to the information processing device (H) in the step S105 shown in FIG. 18.

In this manner, a digital signature for data including the version (Mver) of the revocation information is employed as the signature data transmitted by the information storing device (M) to the information processing device (H) in the mutual authentication processing, and the version (Mver) of the revocation information is also transmitted together in the signature transmission. Due to this feature, check of the validity of the version (Mver) of the revocation information is performed in the sequence of the mutual authentication processing.

This eliminates the need to newly carry out transmission and reception of the revocation information and validity check processing after the end of the mutual authentication processing. Thus, the processing is simplified.

Although it is also possible to individually carry out the above-described embodiment examples 1 to 3, a configuration to execute processing based on an arbitrary combination of the respective embodiment examples may be employed.

[8. Hardware Configuration Examples of Respective Devices]

Figure 21:
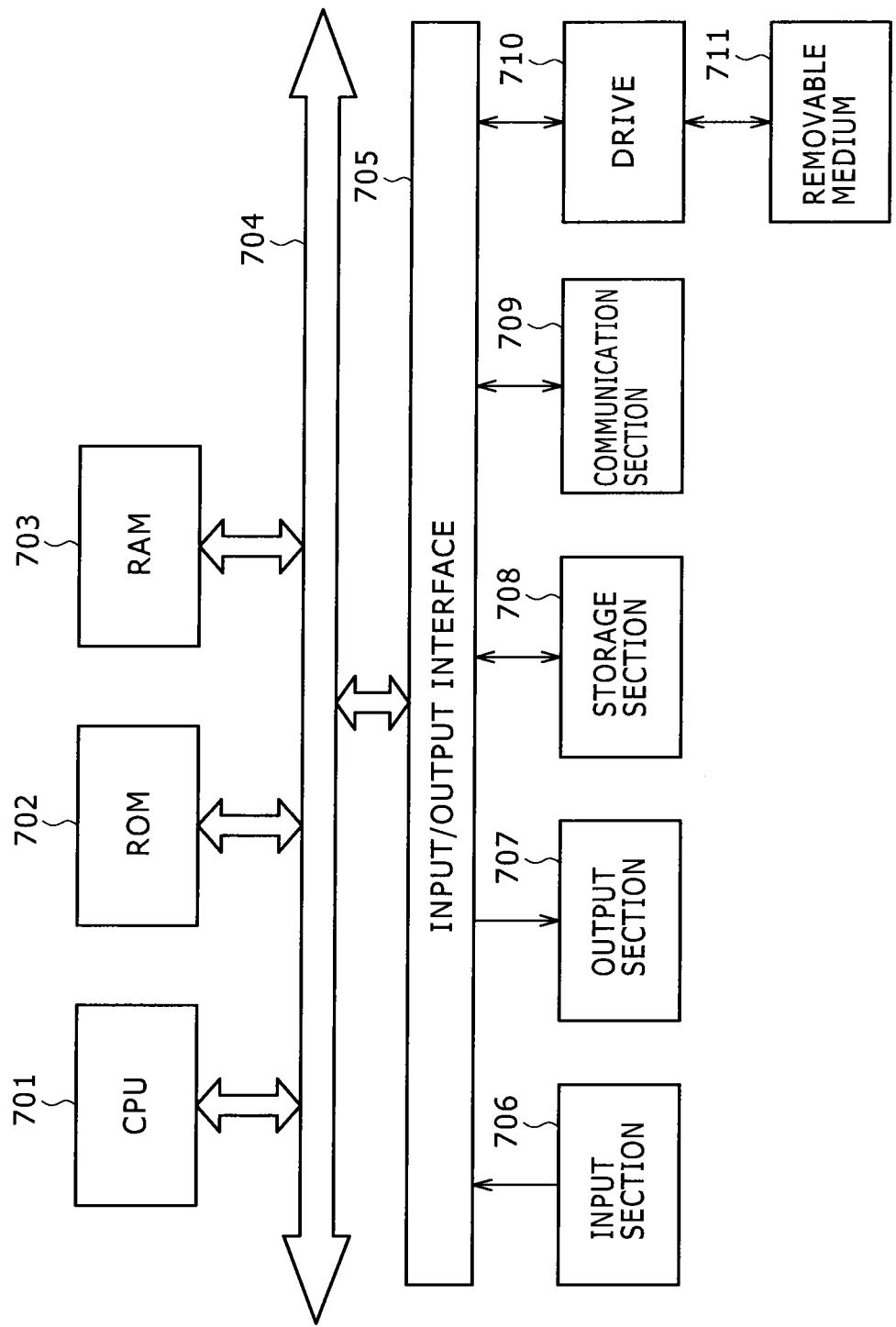
FIG. 21 is a diagram for explaining a hardware configuration example of the information processing device.

At last, with reference to FIG. 21 and FIG. 22, hardware configuration examples of the respective devices to execute the above-described processing will be described.

First, with reference to FIG. 21, a hardware configuration example of the information processing device (H: host) in which a memory card is loaded and that executes recording and reproduction processing of data will be described.

A central processing unit (CPU) 701 functions as a data processor that executes various kinds of processing in accordance with a program stored in a read only memory (ROM) 702 or a storage section 708. For example, the CPU 701 executes processing of receiving content from broadcast stations and servers, processing of recording received data in an information storing device (removable medium 711 in the diagram) such as a memory card, and processing of reproducing data from a memory card (removable medium 711 in the diagram). Programs run by the CPU 701, data, and so forth are arbitrarily stored in a random access memory (RAM) 703. These CPU 701, ROM 702, and RAM 703 are connected to each other by a bus 704.

The CPU 701 is connected to an input/output interface 705 via the bus 704. To the input/output interface 705, an input section 706 composed of various kinds of switches, keyboard, mouse, microphone, etc. and an output section 707 composed of display, speaker, etc. are connected. The CPU 701 executes various kinds of processing in response to an order input from the input section 706 and outputs the processing result to e.g. the output section 707.

The storage section 708 connected to the input/output interface 705 is formed of e.g. a hard disc and stores programs run by the CPU 701 and various kinds of data. A communication section 709 communicates with an external device via a network such as the Internet or a local area network.

A drive 710 connected to the input/output interface 705 drives the removable medium 711 such as magnetic disc, optical disc, magneto-optical disc, or semiconductor memory typified by a memory card, and acquires various kinds of data, such as recorded content and key information. For example, by using the acquired content and key data, decryption and reproduction processing of content and so forth are executed in accordance with a reproduction program run by the CPU.

Figure 22:
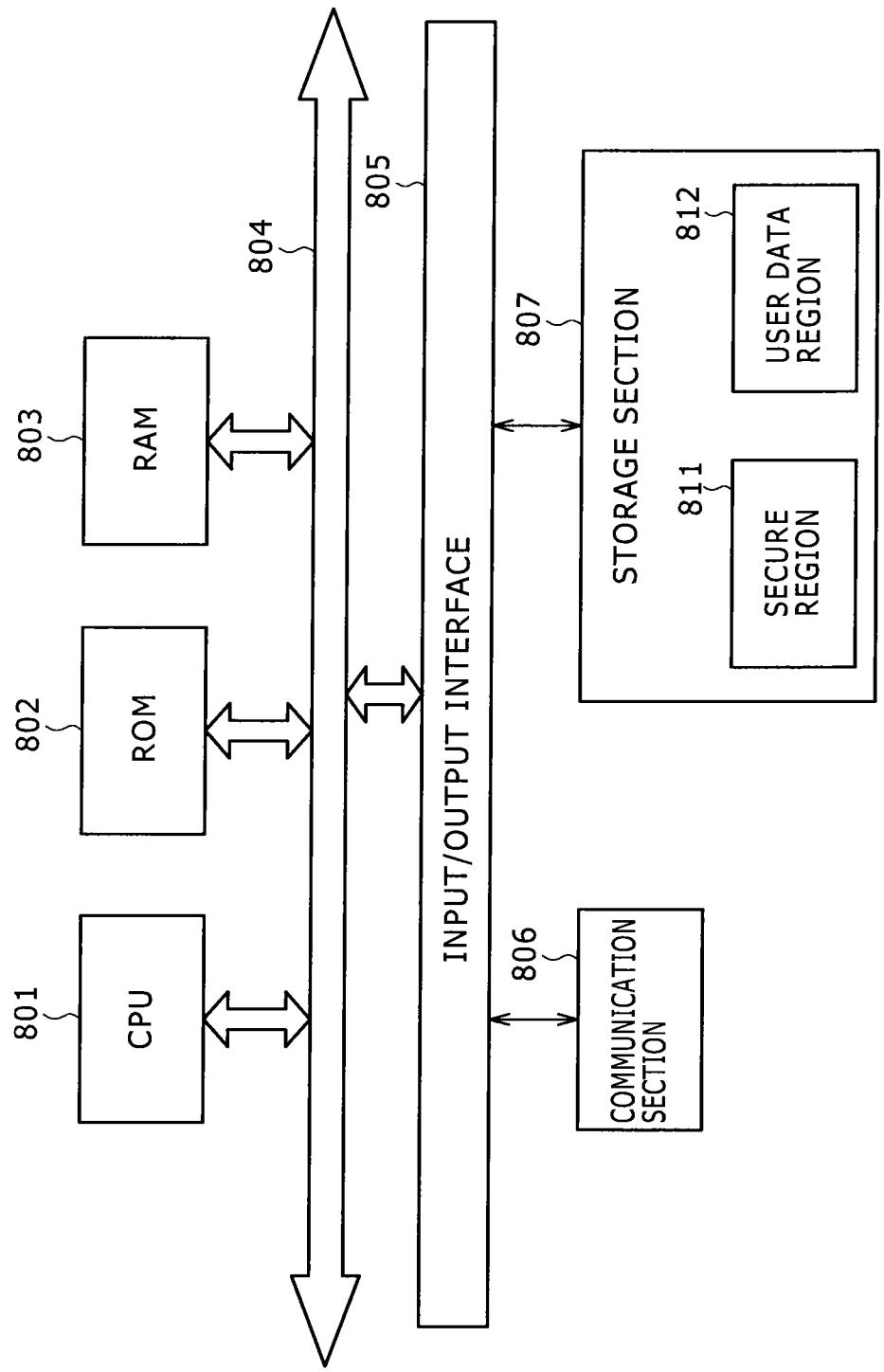
FIG. 22 is a diagram for explaining a hardware configuration example of the information storing device.

FIG. 22 shows a hardware configuration example of the information storing device such as a memory card.

A central processing unit (CPU) 801 functions as a data processor that executes various kinds of processing in accordance with a program stored in a read only memory (ROM) 802 or a storage section 807. For example, the CPU 801 executes processing of communication with server and host equipment, processing of writing, reading, and so forth of data to/from the storage section 807, and processing of determining whether or not access to a secure region 811 of the storage section 807 in units of the separated region is possible, explained in the above-described respective embodiment examples. Programs run by the CPU 801, data, and so forth are arbitrarily stored in a random access memory (RAM) 803. These CPU 801, ROM 802, and RAM 803 are connected to each other by a bus 804.

The CPU 801 is connected to an input/output interface 805 via the bus 804 and a communication section 806 and the storage section 807 are connected to the input/output interface 805.

The communication section 806 connected to the input/output interface 805 performs communication with e.g. server and host. The storage section 807 is a storage region of data and has the secure region 811 involving access limitation as described above and a user data region 812 to/from which data can be freely recorded/read.

[9. Summarization of Configuration of Present Disclosure]

An embodiment of the present disclosure is explained in detail above with reference to specific embodiment examples. However, it is obvious that those skilled in the art can make modification and substitution of the embodiment examples without departing from the gist of the present disclosure. That is, the present disclosure is described in the form of exemplification and should not be interpreted in a limited manner. For determination of the gist of the present disclosure, the section of the scope of the claims should be taken into consideration.

The techniques disclosed in the present specification can take the following configurations.

(1) An information storing device including
a storage section configured to store revocation information that is a list of an identifier of an unauthorized device, and
a data processor configured to execute determination processing of unauthorized equipment in accordance with the revocation information,
wherein
the data processor extracts version information enabling identification of issue order of the revocation information from the revocation information and transmits the extracted version information to a communication counterpart device, and
if the data processor receives the revocation information of a new version of the issue order held by the communication counterpart device from the communication counterpart device, the data processor executes revocation information synchronization processing of substituting the received revocation information of the new version for the revocation information of an old version stored in the storage section to store the revocation information of the new version.

(2) The information storing device according to the above-described (1), wherein the data processor sets and transmits a message authentication code for the version information in transmission processing of the version information.

(3) The information storing device according to the above-described (2), wherein the message authentication code is generated by applying a shared key generated in authentication processing with the communication counterpart device.

(4) The information storing device according to any of the above-described (1) to (3), wherein the data processor sets and transmits a digital signature for the version information in transmission processing of the version information.

(5) The information storing device according to the above-described (4), wherein the digital signature is generated by applying a private key of the information storing device.

(6) The information storing device according to any of the above-described (1) to (5), wherein the data processor executes mutual authentication processing between the information storing device and the communication counterpart device and transmits the version information and a digital signature for data including the version information to the communication counterpart device in the mutual authentication processing.

(7) The information storing device according to the above-described (6), wherein the digital signature is generated by applying a private key of the information storing device.

(8) An information processing device including
a storage section configured to store revocation information that is a list of an identifier of an unauthorized device, and
a data processor configured to execute determination processing of unauthorized equipment in accordance with the revocation information,
wherein
the data processor receives version information enabling identification of issue order of the revocation information held by a communication counterpart device from the communication counterpart device,
the data processor executes version comparison processing between the received version information and version information of self-device-storing revocation information stored in the storage section of the self device,
if a version of the self-device-storing revocation information is newer than a version of the received version information, the data processor transmits the self-device-storing revocation information to the communication counterpart device, and
if the version of the self-device-storing revocation information is older than the version of the received version information, the data processor executes revocation information synchronization processing of receiving the revocation information of the newer version from the communication counterpart device and substituting the received revocation information of the newer version for the revocation information of the old version stored in the storage section to store the revocation information of the newer version.

(9) The information processing device according to the above-described (8), wherein the data processor receives a message authentication code for the version information from the communication counterpart device, and the data processor executes validity check processing of the received version information by verification of the received message authentication code and executes the version comparison processing if validity is confirmed.

(10) The information processing device according to the above-described (9), wherein the message authentication code is generated by applying a shared key generated in authentication processing with the communication counterpart device, and the data processor carries out the message authentication code verification to which the shared key is applied.

(11) The information processing device according to any of the above-described (8) to (10), wherein the data processor receives a digital signature for the version information from the communication counterpart device, and the data processor executes validity check processing of the received version information by verification of the received digital signature and executes the version comparison processing if validity is confirmed.

(12) The information processing device according to the above-described (11), wherein the digital signature is generated by applying a private key of the communication counterpart device, and the data processor carries out verification of the digital signature by applying a public key of the communication counterpart device.

(13) The information processing device according to any of the above-described (8) to (12), wherein the data processor executes mutual authentication processing between the information processing device and the communication counterpart device and receives the version information and a digital signature for data including the version information from the communication counterpart device in the mutual authentication processing, and the data processor executes validity check processing of the received version information by verification of the received digital signature and executes the version comparison processing if validity is confirmed.

(14) The information processing device according to the above-described (13), wherein the digital signature is generated by applying a private key of the communication counterpart device, and the data processor carries out verification of the digital signature by applying a public key of the communication counterpart device.

(15) An information processing system including
an information processing device configured to execute data reproduction processing or data recording processing, and
an information storing device configured to have a storage section serving as a recording region of reproduction-subject data or recording-subject data of the information processing device, wherein each of the information processing device and the information storing device has a storage section configured to store revocation information that is a list of an identifier of an unauthorized device, and a data processor configured to execute determination processing of unauthorized equipment in accordance with the revocation information, the information processing device receives version information enabling identification of issue order of the revocation information held by the information storing device from the information storing device, the information processing device executes version comparison processing between the received version information and version information of self-device-storing revocation information stored in the storage section of the self device, if a version of the self-device-storing revocation information is newer than a version of the received version information, the information processing device transmits the self-device-storing revocation information to the information storing device, if the version of the self-device-storing revocation information is older than the version of the received version information, the information processing device executes revocation information synchronization processing of receiving the revocation information of the newer version from the information storing device and substituting the received revocation information of the newer version for the revocation information of the old version stored in the storage section to store the revocation information of the newer version, in response to a request by the information processing device, the information storing device extracts the version information enabling identification of the issue order of the revocation information from the revocation information stored in the storage section of the information storing device and transmits the extracted version information to the information processing device, and if the information storing device receives the revocation information of a new version of the issue order held by the information processing device from the information processing device, the information storing device executes revocation information synchronization processing of substituting the received revocation information of the new version for the revocation information of an old version stored in the storage section to store the revocation information of the new version.

Moreover, methods of processing executed in the above-described devices and system and programs for making processing be executed are also included in the configuration of the present disclosure.

The series of processing explained in the specification can be executed by hardware or software or a composite configuration of both. In the case of executing the processing by software, a program in which the processing sequence is recorded can be installed into a memory in a computer incorporated in dedicated hardware and be run. Alternatively, the program can be installed into a general-purpose computer capable of executing various kinds of processing and be run. For example, the program can be recorded in a recording medium in advance. Besides being installed from a recording medium into a computer, the program can be received via a network such as a local area network (LAN) or the Internet and be installed into a recording medium such as a built-in hard disc.

Various kinds of processing described in the specification may be not only executed in a time-series manner in accordance with the description but also executed in parallel or individually depending on the processing capability of the device that executes the processing or according to need. Furthermore, the term "system" in the present specification refers to a logical aggregate configuration of plural devices and is not limited to a configuration in which devices having the respective configurations exist in the same chassis.

As described above, according to the configuration of one embodiment of the present disclosure, alleviation of the processing burden in the synchronization processing of the revocation information and safe, sure processing are realized.

Specifically, the information processing device as the host device receives the version of the revocation information from the information storing device such as a memory card and performs comparison between the received version and the version of the revocation information of the self device.

If the self-device version is newer than the received version, the information processing device transmits the revocation information of the self device to the information storing device. If the self-device version is older than the received version, the information processing device receives the revocation information from the information storing device and updates the revocation information.

As above, because a configuration in which only the version is transmitted and received for the version comparison, and MAC and signature are set is employed, alleviation of communication processing of the equipment and the processing burden, and safe and sure version comparison are enabled.

The present technology contains subject matter related to that disclosed in Japanese Priority Patent Application JP 2011-212267 filed in the Japan Patent Office on Sep. 28, 2011, the entire content of which is hereby incorporated by reference.

What is claimed is:

1. An information storing device comprising:

a storage section configured to store first revocation information that is a list of an identifier of an unauthorized device; and circuitry configured to execute determination processing of unauthorized equipment in accordance with the first revocation information, wherein the circuitry extracts first version information that indicates a first version number of the first revocation information enabling identification of issue order of the first revocation information from the first revocation information, sets a first message authentication code based on the first version information and transmits the extracted first version information and the first message authentication code to a communication counterpart device, the circuitry is configured so that (1) when the circuitry receives a request for transmitting the first revocation information from the communication counterpart device, the circuitry transmits first revocation information including first signature information, and (2) when the circuitry receives second revocation information held by the communication counterpart device from the communication counterpart device, the second revocation information including second signature information, the circuitry checks whether a second version number of issue order of the second revocation information is newer than the first version number, and when the second version number is newer than the first version number, the circuitry verifies the second signature information by applying a public key of a certificate authority stored in the storage section, and when the second signature information is verified, the circuitry executes revocation information synchronization processing of substituting the second revocation information of the second version for the first revocation information of the first version stored in the storage section to store the second revocation information of the second version, sets a second message authentication code based on the second version information, and transmits the second message authentication code to the communication counterpart device.

2. The information storing device according to claim 1, wherein the first message authentication code and the second message authentication code are generated by applying a shared key generated in authentication processing with the communication counterpart device.

3. The information storing device according to claim 1, wherein the first signature information is generated by applying a private key of the information storing device.

4. The information storing device according to claim 1, wherein
the circuitry executes mutual authentication processing between the information storing device and the communication counterpart device and transmits the first version information and the first signature information for the first version information to the communication counterpart device in the mutual authentication processing.

5. The information storing device according to claim 4, wherein
the first signature information is generated by applying a private key of the information storing device.

6. An information processing device comprising:
a storage section configured to store second revocation information that is a list of an identifier of an unauthorized device; and
circuitry configured to execute determination processing of unauthorized equipment in accordance with the second revocation information, wherein
the circuitry receives first version information that indicates a first version number of first revocation information enabling identification of issue order of the first revocation information held by a communication counterpart device from the communication counterpart device,
the circuitry receives a first message authentication code for the first version information from the communication counterpart device,
the circuitry executes validity check processing of the first version information by verification of the received first message authentication code,
if validity is confirmed in the validity check processing, the circuitry executes version comparison processing between the received first version information and second version information of the second revocation information that indicates a second version number of the second revocation information stored in the storage section,
the circuitry is configured so that
(1) when a version of the second revocation information is newer than a version of the first version information, the circuitry transmits the second revocation information including second signature information to the communication counterpart device, receives a second message authentication code for the second version information from the communication counterpart device, and executes validity check processing of the second version information by verification of the received second message authentication code, and
(2) when the version of the second revocation information is older than the version of the first version information, the circuitry transmits a request for transmitting the first revocation information to the communication counterpart device, receives the first revocation information including first signature information from the communication counterpart device, verifies the first signature information by applying a public key of a certificate authority stored in the storage section, and when the first signature information is verified, executes revocation information synchronization processing of substituting the first revocation information of the first version for the second revocation information of the second version stored in the storage section to store the first revocation information of the first version.

7. The information processing device according to claim 6, wherein the first message authentication code and the second message authentication code are generated by applying a shared key generated in authentication processing with the communication counterpart device.

8. The information processing device according to claim 6, wherein
the first signature information is generated by applying a private key of the communication counterpart device, and
the circuitry carries out verification of the first signature information by applying a public key of the communication counterpart device.

9. The information processing device according to claim 6, wherein
the circuitry executes mutual authentication processing between the information processing device and the communication counterpart device and receives the first version information and a first signature information for the first version information from the communication counterpart device in the mutual authentication processing, and
the circuitry executes validity check processing of the first version information by verification of the received first signature information and executes the version comparison processing if validity is confirmed.

10. The information processing device according to claim 9, wherein
the first signature information is generated by applying a private key of the communication counterpart device, and
the circuitry carries out verification of the first signature information by applying a public key of the communication counterpart device.

11. An information processing system comprising:
an information processing device configured to execute data reproduction processing or data recording processing; and
an information storing device configured to have a storage section serving as a recording region of reproduction-subject data or recording-subject data of the information processing device, wherein
the information storing device has
a first storage section configured to store first revocation information that is a list of an identifier of an unauthorized device, and
a first circuitry configured to execute determination processing of unauthorized equipment in accordance with the first revocation information,
the information processing device has
a second storage section configured to store second revocation information that is a list of an identifier of an unauthorized device, and a second circuitry configured to execute determination processing of unauthorized equipment in accordance with the second revocation information, the information processing device receives first version information that indicates a first version number of the first revocation information enabling identification of issue order of the first revocation information held by the information storing device from the information storing device, the information processing device receives a first message authentication code for the first version information from the information storing device, the information processing device executes validity check processing of the first version information by verification of the received first message authentication code, if validity is confirmed in the validity check processing, the information processing device executes version comparison processing between the first version information and second version information of second revocation information that indicates a second version number of the second revocation information stored in the second storage section, the information processing device is configured so that (1) when a version of the second revocation information is newer than a version of the first version information, the information processing device transmits the second revocation information including second signature information to the information storing device, receives a second message authentication code for the second version information from the information storing device, and executes validity check processing of the second version information by verification of the received second message authentication code, and (2) when the version of the second revocation information is older than the version of the first version information, the information processing device transmits a request for transmitting the first revocation information to the information storing device, receives the first revocation information including first signature information from the information storing device, verifies the first signature information by applying a public key of a certificate authority stored in the second storage section, and when the first signature information is verified, executes revocation information synchronization processing of substituting the received first revocation information of the first version for the second revocation information of the second version stored in the second storage section to store the first revocation information of the first version, in response to a request by the information processing device, the information storing device extracts the first version information enabling identification of the issue order of the first revocation information from the first revocation information stored in the first storage section of the information storing device, sets the first message authentication code based on the first version information, and transmits the extracted first version information and the first message authentication code to the information processing device, and the information storing device is configured so that (1) when the information storing device receives a request for transmitting the first revocation information from the information processing device, the information storing device transmits the first revocation information including the first signature information, and (2) when the information storing device receives the second revocation information held by the information processing device from the information processing device, the second revocation information including the second signature information, the information storing device checks whether the second version number of issue order of the second revocation information is newer than the first version number, and when the second version number is newer than the first version number, the information storing device verifies the second signature information by applying the public key of the certificate authority stored in the first storage section, and when the second signature information is verified, the information storing device executes revocation information synchronization processing of substituting the received second revocation information of the second version for the first revocation information of the first version stored in the first storage section to store the second revocation information of the second version, sets the second message authentication code based on the second version information, and transmits the second message authentication code to the information processing device.

12. An information processing method carried out in an information storing device, the information storing device having a storage section configured to store first revocation information that is a list of an identifier of an unauthorized device, and circuitry configured to execute determination processing of unauthorized equipment in accordance with the first revocation information, the method comprising:

by the circuitry, extracting first version information that indicates a first version number of the first revocation information enabling identification of issue order of the first revocation information from the first revocation information, setting a first message authentication code based on the first version information, and transmitting the extracted first version information and the first message authentication code to a communication counterpart device; and by the circuitry, (1) when the circuitry receives a request for transmitting the first revocation information from the communication counterpart device, transmitting first revocation information including first signature information, and (2) when the circuitry receives the second revocation information held by the communication counterpart device from the communication counterpart device, the second revocation information including second signature information, checking whether a second version number of issue order of the second revocation information is newer than the first version number, and when the second version number is newer than the first version number, verifying the second signature information by applying a public key of a certificate authority stored in the storage section, and when the second signature information is verified, executing revocation information synchronization processing of substituting received second revocation information of the second version for the first revocation information of the first version stored in the storage section to store the second revocation information of the second version, setting a second message authentication code based on the second version information, and transmitting the second message authentication code to the communication counterpart device.

13. An information processing method carried out in an information processing device, the information processing device having a storage section configured to store second revocation information that is a list of an identifier of an unauthorized device, and circuitry configured to execute determination processing of unauthorized equipment in accordance with the second revocation information, the method comprising:

by the circuitry, receiving first version information that indicates a first version number of first revocation information enabling identification of issue order of the first revocation information held by a communication counterpart device from the communication counterpart device;

receiving a first message authentication code for the first version information from the communication counterpart device, executing validity check processing of the first version information by verification of the received first message authentication code, if validity is confirmed in the validity check processing, by the circuitry, executing version comparison processing between the first version information and second version information of second revocation information that indicates a second version number of the second revocation information stored in the storage section;

by the circuitry, (1) when a version of the second revocation information is newer than a version of the first version information, transmitting the second revocation information including second signature information to the communication counterpart device, receiving a second message authentication code for the second version information from the communication counterpart device, and executing validity check processing of the second version information by verification of the received second message authentication code; and (2) when the version of the second revocation information is older than the version of the first version information, transmitting a request for transmitting the first revocation information to the communication counterpart device, receiving the first revocation information including first signature information from the communication counterpart device, verifying the first signature information by applying a public key of a certificate authority stored in the storage section, and when the first signature information is verified, executing revocation information synchronization processing of substituting the first revocation information of the first version for the second revocation information of the second version stored in the storage section to store the first revocation information of the first version.

14. A non-transitory computer readable medium including executable instructions, which when executed by circuitry cause circuitry to execute a method executed in an information storing device, the information storing device having a storage section configured to store first revocation information that is a list of an identifier of an unauthorized device, and circuitry configured to execute determination processing of unauthorized equipment in accordance with the revocation information, the non-transitory computer readable medium causing the circuitry to carry out a processing sequence comprising:

processing of extracting first version information that indicates a first version number of the first revocation information enabling identification of issue order of the first revocation information from the first revocation information, setting a first message authentication code based on the first version information, and transmitting the extracted first version information and the first message authentication code to a communication counterpart device; and (1) when the circuitry receives a request for transmitting the first revocation information from the communication counterpart device, transmitting first revocation information including first signature information, and (2) when the circuitry receives the second revocation information held by the communication counterpart device from the communication counterpart device, the second revocation information including second signature information, checking whether a second version number of issue order of the second revocation information is newer than the first version number, and when the second version number is newer than the first version number, verifying the second signature information by applying a public key of a certificate authority stored in the storage section, and when the second signature information is verified, executing revocation information synchronization processing of substituting received second revocation information of the second version for the first revocation information of the first version stored in the storage section to store the second revocation information of the second version, setting a second message authentication code based on the second version information, and transmitting the second message authentication code to the communication counterpart device.

15. A non-transitory computer readable medium including executable instructions, which when executed by circuitry cause circuitry to execute a method executed in an information processing device, the information processing device having a storage section configured to store second revocation information that is a list of an identifier of an unauthorized device, and circuitry configured to execute determination processing of unauthorized equipment in accordance with the second revocation information, the non-transitory computer readable medium causing the circuitry to carry out a processing sequence comprising:

processing of receiving first version information that indicates a first version number of first revocation information enabling identification of issue order of the first revocation information held by a communication counterpart device from the communication counterpart device;

receiving a first message authentication code for the first version information from the communication counterpart device, executing validity check processing of the first version information by verification of the received first message authentication code, if validity is confirmed in the validity check processing, executing version comparison processing between the first version information and second version information of the second revocation information that indicates a second version number of the second revocation information stored in the storage section;

(1) when a version of the second revocation information is newer than a version of the first version information, processing of transmitting the second revocation information to the communication counterpart device, receiving a second message authentication code for the second version information from the communication counterpart device, and executing validity check processing of the second version information by verification of the received second message authentication code; and (2) when the version of the second revocation information is older than the version of the first version information, transmitting a request for transmitting the first revocation information to the communication counterpart device, receiving the first revocation information including first signature information from the communication counterpart device, verifying the first signature information by applying a public key of a certificate authority stored in the storage section, and when the first signature information is verified, executing revocation information synchronization processing of substituting the first revocation information of the first version for the second revocation information of the second version stored in the storage section to store the first revocation information of the first version.

16. The information storing device according to claim 1, wherein
the circuitry does not transmit the first revocation information to the communication counterpart device.

17. The information storing device according to claim 1, wherein
the information storing device is a detachable device to the communication counterpart device.

\* \* \* \* \*